(12) United States Patent
Yamada

(10) Patent No.: US 11,516,503 B2
(45) Date of Patent: Nov. 29, 2022

(54) ENCODING APPARATUS, DECODING APPARATUS, ENCODING METHOD, DECODING METHOD, AND STORAGE MEDIUM

(71) Applicant: FUJITSU LIMITED, Kawasaki (JP)

(72) Inventor: Kohji Yamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 191 days.

(21) Appl. No.: 17/172,116

(22) Filed: Feb. 10, 2021

(65) Prior Publication Data

US 2021/0306660 A1 Sep. 30, 2021

(30) Foreign Application Priority Data

Mar. 25, 2020 (JP) .............................. JP2020-053912

(51) Int. Cl.
*H04N 19/577* (2014.01)
*H04N 19/543* (2014.01)
*H04N 19/423* (2014.01)

(52) U.S. Cl.
CPC ......... *H04N 19/577* (2014.11); *H04N 19/423* (2014.11); *H04N 19/543* (2014.11)

(58) Field of Classification Search
CPC .................................................... H04N 19/577
USPC ..................................................... 375/240.15
See application file for complete search history.

(56) References Cited

U.S. PATENT DOCUMENTS

| | | | |
|---|---|---|---|
| 2011/0258339 A1 | 10/2011 | Matsui et al. | |
| 2017/0006300 A1* | 1/2017 | Tsukuba | ................ H04N 19/44 |
| 2021/0112246 A1* | 4/2021 | Aono | .................... H04N 19/70 |

FOREIGN PATENT DOCUMENTS

| | | |
|---|---|---|
| JP | 2008-092503 A | 4/2008 |
| JP | 2012-015868 A | 1/2012 |
| JP | 2017-112539 A | 6/2017 |

* cited by examiner

*Primary Examiner* — Yulin Sun
(74) *Attorney, Agent, or Firm* — Fujitsu Patent Center

(57) ABSTRACT

An encoding apparatus, includes a memory; and a processor coupled to the memory and configured to: perform intra-screen prediction encoding on an image of a region of a still image cut out from a first decoded image corresponding to a screen image before a predetermined region is switched from a video to a still image, generate a second decoded image obtained by decoding information for which the intra-screen prediction is performed, and when a first screen image after the predetermined region is switched from a video to a still image is received, perform inter-screen prediction encoding on an image of a region of a still image cut out from the first screen image after switching to a still image, by referring to the generated second decoded image.

12 Claims, 20 Drawing Sheets

100

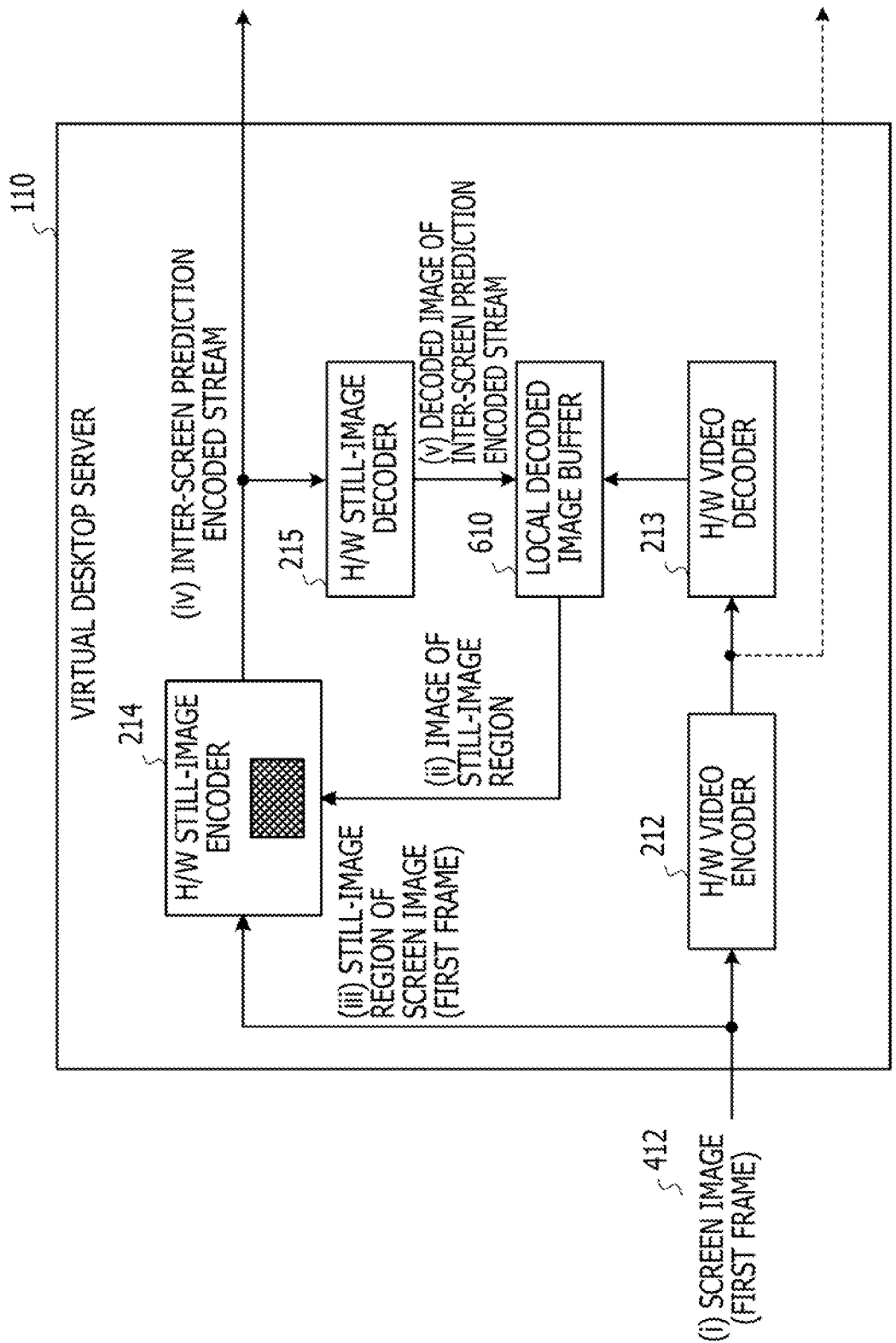

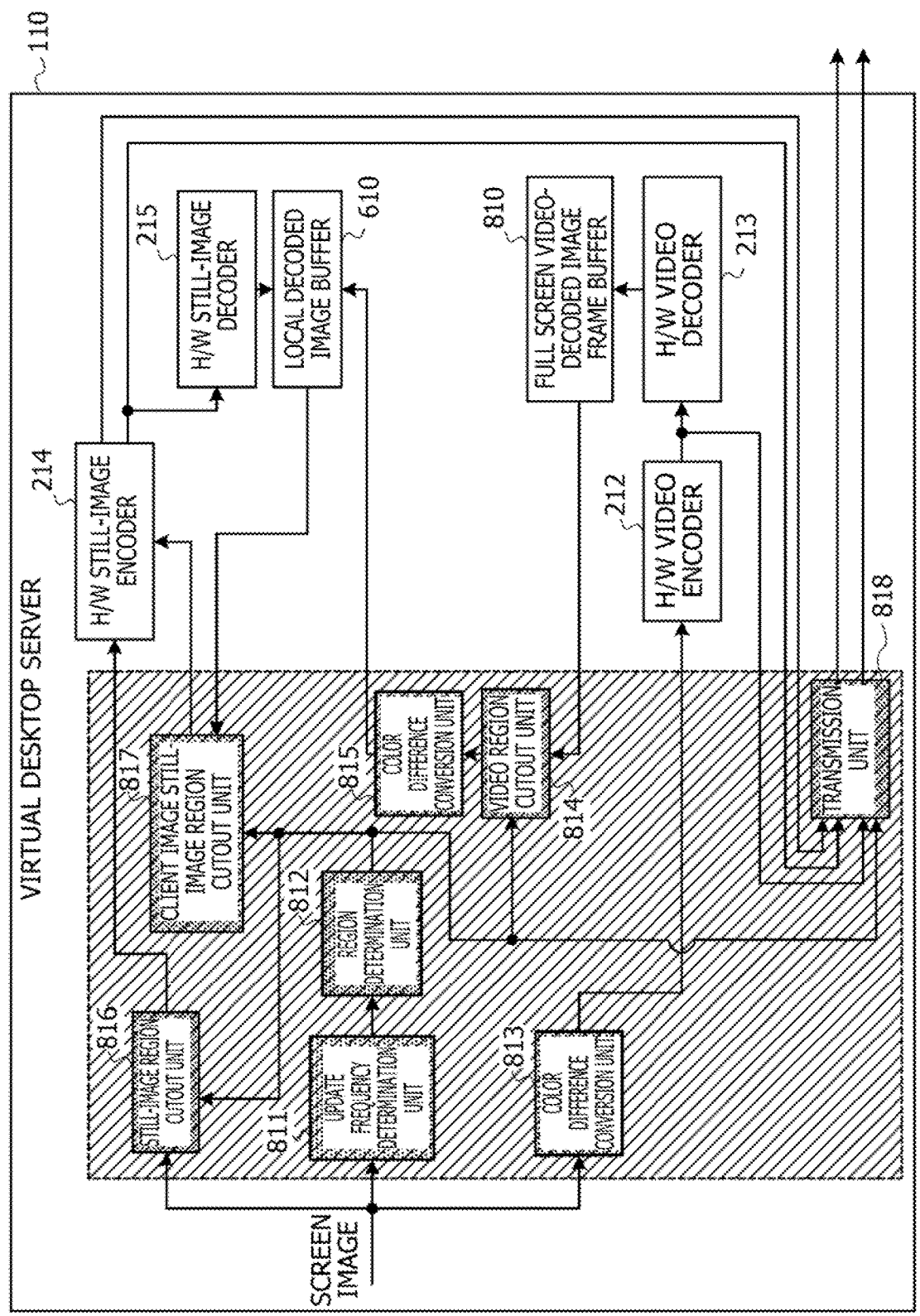

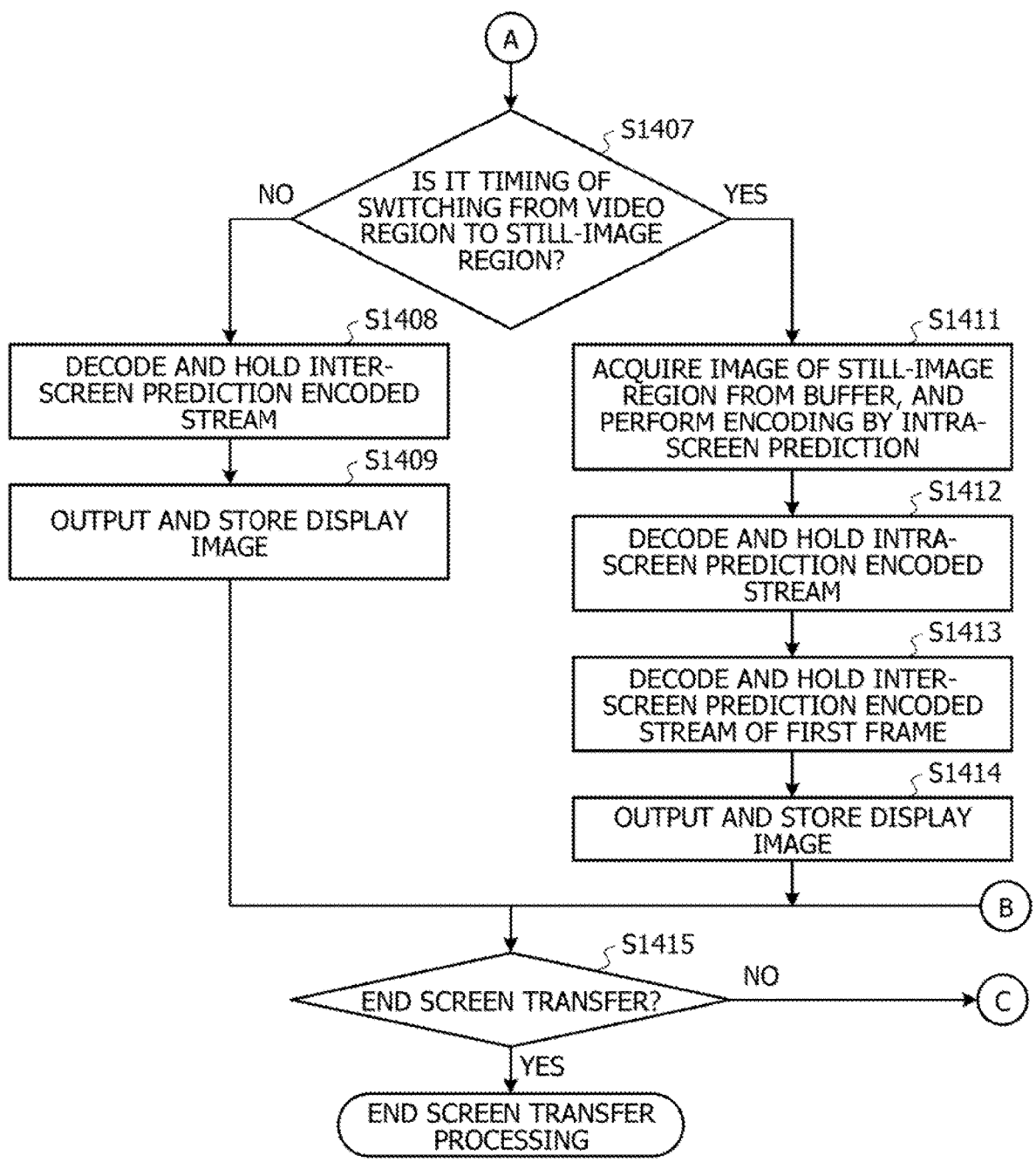

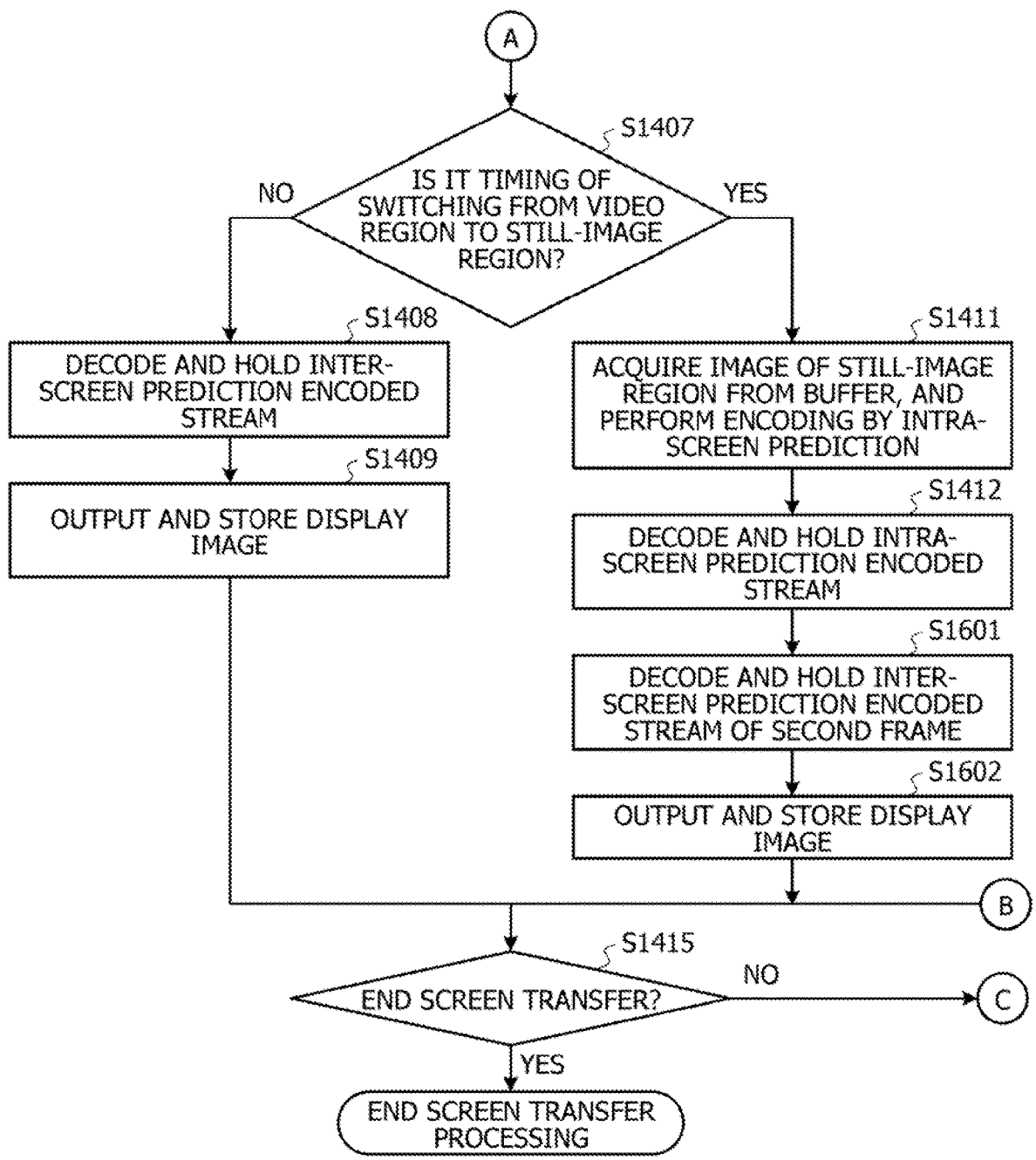

ENCODING APPARATUS, DECODING APPARATUS, ENCODING METHOD, DECODING METHOD, AND STORAGE MEDIUM

CROSS-REFERENCE TO RELATED APPLICATION

This application is based upon and claims the benefit of priority of the prior Japanese Patent Application No. 2020-53912, filed on Mar. 25, 2020, the entire contents of which are incorporated herein by reference.

FIELD

The embodiments discussed herein are related to an encoding apparatus, a decoding apparatus, an encoding method, a decoding method, and a storage medium.

BACKGROUND

Heretofore, a screen transfer system that encodes and transfers a screen image displayed on a display screen is known. In the screen transfer system, various encoders such as a video encoder that encodes a video and a still-image encoder that encodes a still image are combined, and are used depending on the update frequency of the screen image.

On the other hand, in order to cope with high resolution of a screen image, improvement of a frame rate, and the like, for example, application of a hardware still-image encoder that achieves higher-speed processing as a still-image encoder is under consideration. As related art, Japanese Laid-open Patent Publication No. 2012-15868, Japanese Laid-open Patent Publication No, 2008-92503, and the like are disclosed.

SUMMARY

According to an aspect of the embodiments, an encoding apparatus, includes a memory; and a processor coupled to the memory and configured to: perform intra-screen prediction encoding on an image of a region of a still image cut out from a first decoded image corresponding to a screen image before a predetermined region is switched from a video to a still image, generate a second decoded image obtained by decoding information for which the intra-screen prediction is performed, and when a first screen image after the predetermined region is switched from a video to a still image is received, perform inter-screen prediction encoding on an image of a region of a still image cut out from the first screen image after switching to a still image, by referring to the generated second decoded image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a second diagram illustrating an overview of the functional configuration of the virtual desktop server;

FIG. 8 is a diagram illustrating details of the functional configuration of the virtual desktop server;

FIGS. 14A and 14B are a first flowchart illustrating the flow of screen transfer processing in the user terminal;

FIGS. 16A and 16B are a second flowchart illustrating the flow of screen transfer processing in the user terminal.

DESCRIPTION OF EMBODIMENTS

However, since the hardware still-image encoder may not change the internal operation, for example, when attempting to perform encoding processing by inter-screen prediction, there is a problem that a reference image may not be captured at the time of switching from a video region to a still-image region.

Therefore, the hardware still-image encoder performs encoding processing of the still-image region at the time of switching by intra-screen prediction. As a result, an amount of information generated at the time of switching increases, compared with a software still-image encoder capable of performing encoding processing by inter-screen prediction.

Considering the above, it is desirable to suppress the amount of information generated when encoding an image of the still-image region of the screen image.

Hereinafter, the embodiments of the present disclosure are described with reference to the accompanying drawings. In the specification and drawings, constituent elements having substantially the same functional configuration are described with the same reference sign and the overlapping description thereof is omitted.

First Embodiment

<System Configuration of Screen Transfer System>

Figure 1:
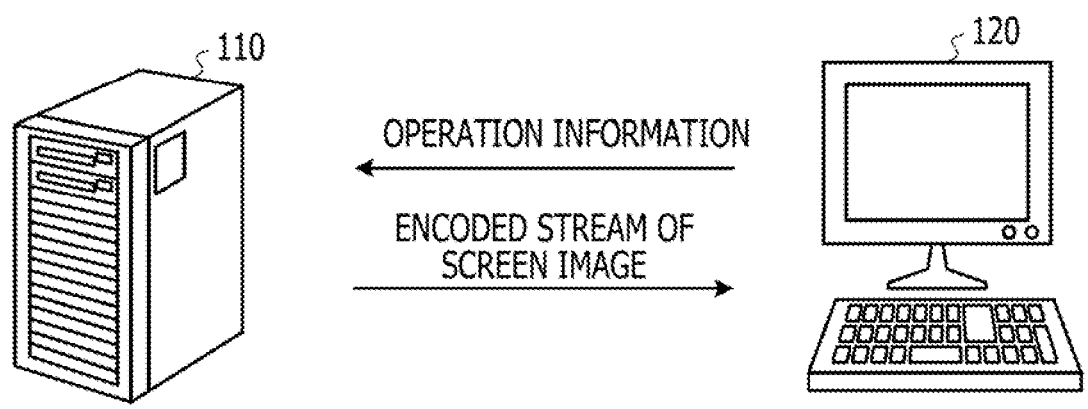
FIG. 1 is a diagram illustrating one example of the system configuration of the screen transfer system.

First, a system configuration of a screen transfer system according to a first embodiment will be described. FIG. 1 is a diagram illustrating one example of the system configuration of the screen transfer system.

As illustrated in FIG. 1, a screen transfer system 100 includes a virtual desktop server 110 which is one example of an encoding apparatus, and a user terminal 120 which is one example of a decoding apparatus communicably coupled to the virtual desktop server 110.

The virtual desktop server 110 encodes an image of a display screen (screen image) generated by executing various applications, and transmits an encoded stream to the user terminal. Thus, the user terminal 120 decodes the encoded stream received from the server and displays the screen image.

The virtual desktop server 110 receives operation information from the user terminal 120 in a case where a user operates the user terminal 120 and inputs various instructions to the applications in response to the display of the screen image.

By using the virtual desktop server 110 with a screen transfer function, the user does not have to store data in the user terminal 120 when executing various applications. As a result, the screen transfer system 100 may suppress information leakage from the user terminal 120, thereby achieving security improvement.

<Hardware Configuration of Each Apparatus in Screen Transfer System>

Next, a hardware configuration of each apparatus (the virtual desktop server 110 and the user terminal 120) of the screen transfer system 100 will be described.

(1) Hardware Configuration of Virtual Desktop Server

Figure 2:
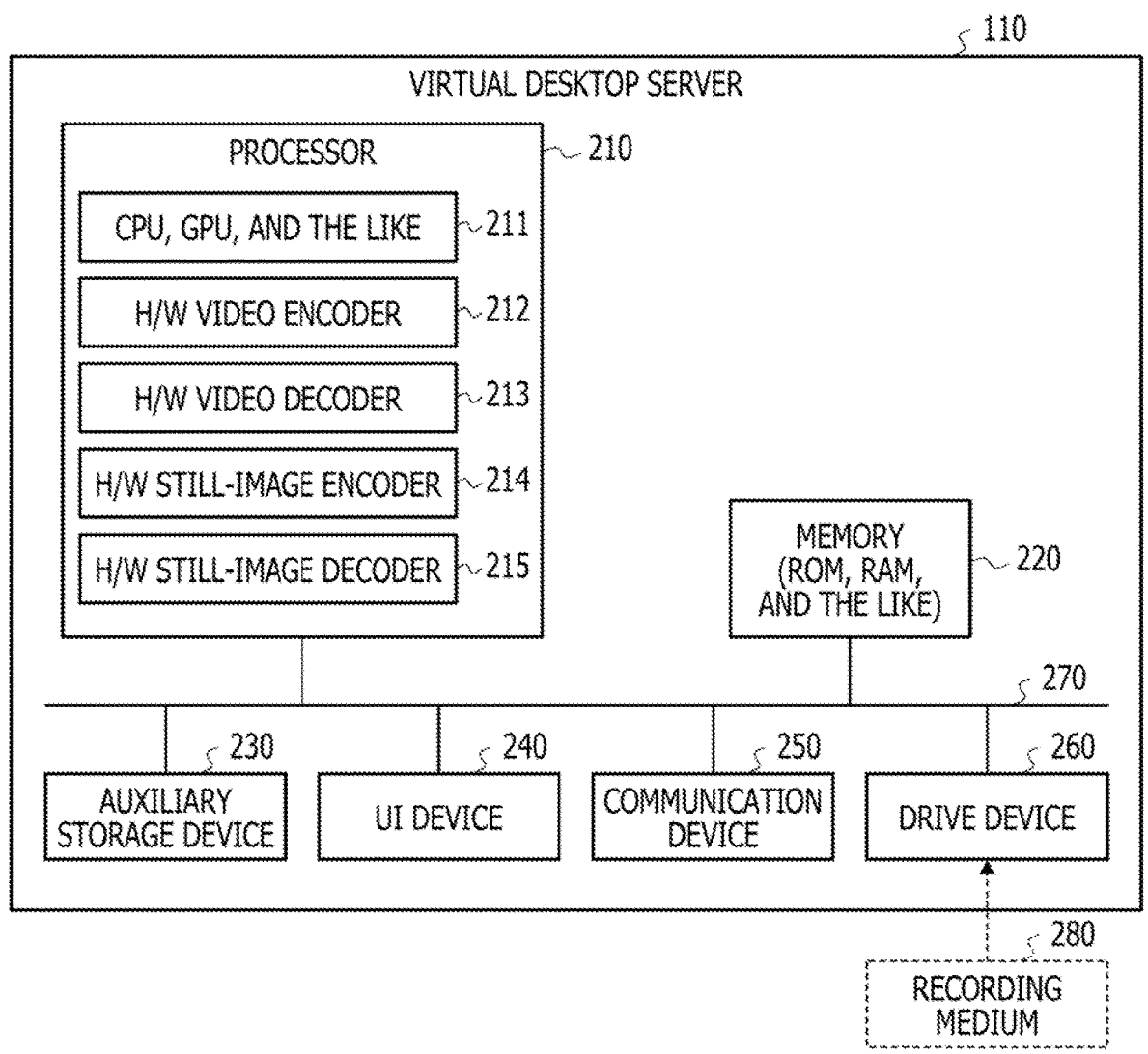
FIG. 2 is a diagram illustrating one example of the hardware configuration of a virtual desktop server.

FIG. 2 is a diagram illustrating one example of the hardware configuration of the virtual desktop server. As illustrated in FIG. 2, the virtual desktop server 110 includes a processor 210 and a memory 220, The virtual desktop server 110 includes an auxiliary storage device 230, a user interface (UI) device 240, a communication device 250, and a drive device 260. The hardware components of the virtual desktop server 110 are coupled to each other via a bus 270.

The processor 210 includes various computing devices 211 such as a central processing unit (CPU) and a graphics processing unit (CPU). The various computing devices 211 read and execute various programs over the memory 220.

The processor 210 includes a hardware video encoder 212 that performs video encoding on the screen image to generate a video encoded stream, and a hardware video decoder 213 that decodes the video encoded stream to generate a decoded image.

The processor 210 includes a hardware still-image encoder 214 that performs still-image encoding on a still-image region in the screen image to generate a still-image encoded stream. The processor 210 includes a hardware still-image decoder 215 that decodes the still-image encoded stream to generate a still-image region decoded image.

The memory 220 includes main storage devices such as a read-only memory (ROM) and a random-access memory (RAM). The processor 210 and the memory 220 form a so-called computer, and the various computing devices 211 of the processor 210 execute various programs read over the memory 220, whereby the computer implements various functions. The various computing devices 211 of the processor 210 operate the hardware video encoder 212, the hardware video decoder 213, the hardware still-image encoder 214, and the hardware still-image decoder 215 of the processor 210, whereby the computer implements the various functions, Details of the various functions implemented by the computer will be described later.

The auxiliary storage device 230 stores various programs, various information used when the various programs are executed by the various computing devices 211 of the processor 210, and the like.

The UI device 240 includes an input device for an administrator of the virtual desktop server 110 to input various instructions to the virtual desktop server 110, a display device for displaying an internal state of the virtual desktop server 110 to the administrator, and the like.

The communication device 250 is a communication device for communicating with the user terminal 120 via a network.

The drive device 260 is a device in which a recording medium 280 is set. The recording medium 280 discussed herein includes a medium that records information optically, electrically, or magnetically, such as a compact disk read-only memory (CD-ROM), a flexible disk, and a magneto-optical disk. The recording medium 280 may also include a semiconductor memory and the like, such as a ROM and a flash memory, which record information electrically.

The various programs to be installed in the auxiliary storage device 230 are installed, for example, as the distributed recording medium 280 is set in the drive device 260, and the various programs recorded in the recording medium 280 are read by the drive device 260. Alternatively, the various programs to be installed in the auxiliary storage device 230 may be installed by downloading the programs from the network through the communication device 250.

(2) Hardware Configuration of User Terminal

Figure 3:
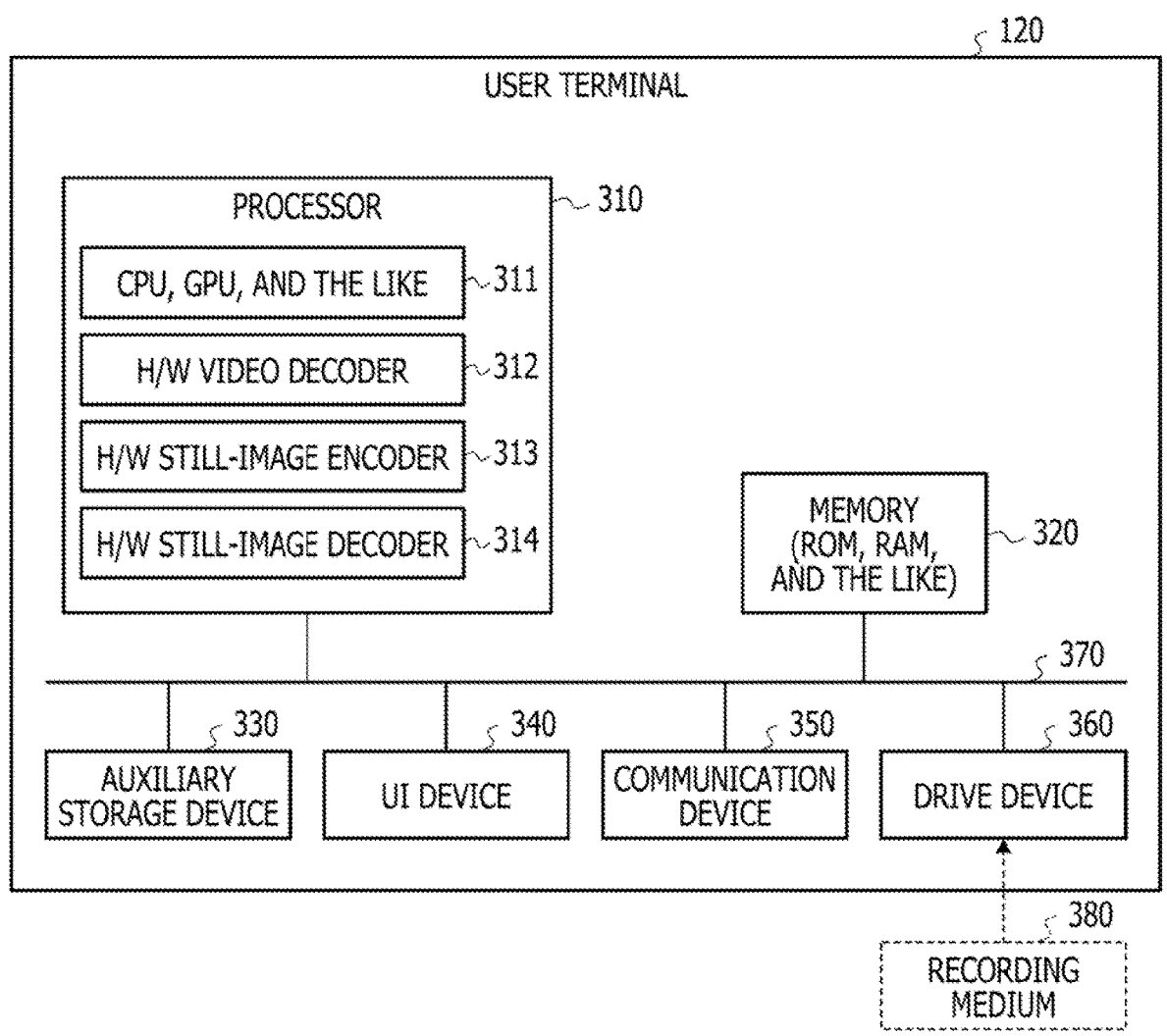
FIG. 3 is a diagram illustrating one example of the hardware configuration of a user terminal.

FIG. 3 is a diagram illustrating one example of the hardware configuration of the user terminal. The difference between FIG. 2 and FIG. 3 is that a hardware video encoder is not included in the case of FIG. 3. Since the other hardware components are basically the same as those of the virtual desktop server 110, a detailed description thereof will be omitted here.

<Switching from Video Region to Still-Image Region>

Figure 4A:
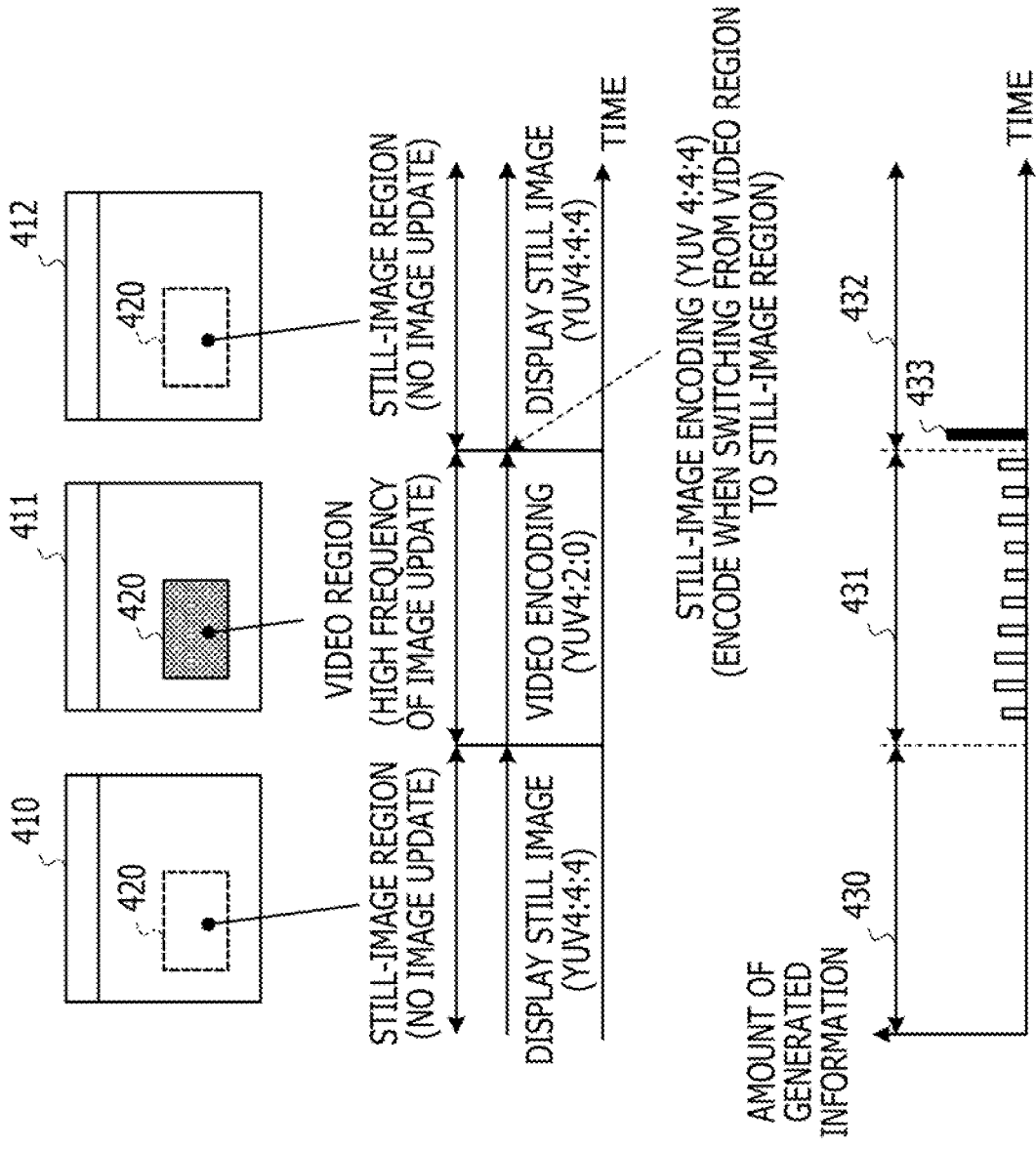
FIGS. 4A and 4B are diagrams illustrating a relationship between switching from a video region to a still-image region and an amount of generated information.
Figure 4B:
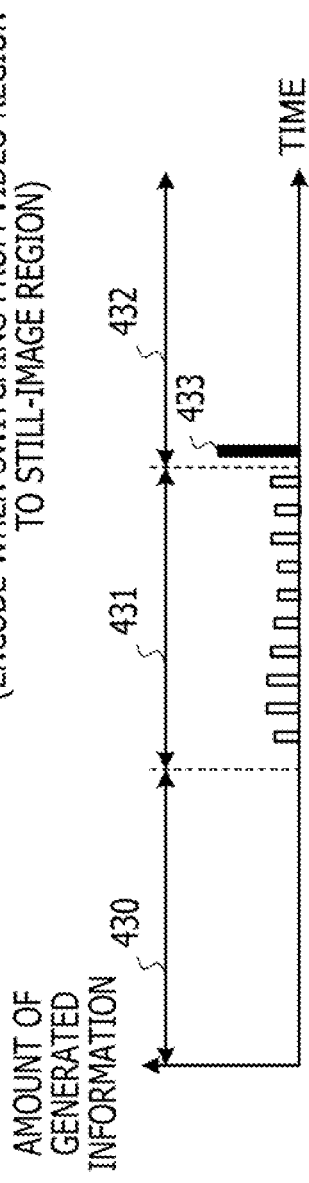

Next, an amount of information generated when a predetermined region of the screen image transferred from the virtual desktop server to the user terminal is switched from a video region to a still-image region will be described. FIGS. 4A and 4B are diagrams illustrating a relationship between switching from the video region to the still-image region and an amount of generated information.

FIG. 4A illustrates a state in which a predetermined region 420 in screen images 410, 411, 412 at each time changes from the still-image region to the video region, and then to the still-image region. The still-image region is a region in which an image update frequency within a predetermined time is lower than a predetermined threshold, and the video region is a region in which the image update frequency within the predetermined time is equal to or higher than the predetermined threshold.

On the other hand, FIG. 4B illustrates an amount of generated information of a video encoded stream or a still-image encoded stream generated at each time by a common virtual desktop server encoding the predetermined region 420 in the screen images 410, 411, and 412.

As illustrated in FIG. 4B, in a case where the predetermined region 420 is the still-image region, since the difference between frames is 0, the amount of generated information of the still-image encoded stream is 0 if inter-screen prediction encoding may be performed (see the section indicated by an arrow 430). On the other hand, in a case where the predetermined region 420 is the video region, the amount of generated information in each frame of the video encoded stream is as indicated by an arrow 431. The amount of generated information in each frame of the still-image encoded stream when the predetermined region 420 is switched from the video region to the still-image region is as indicated by an arrow 432.

For example, since the hardware still-image encoder may not change the internal operation, it may not capture a reference image for performing inter-screen prediction encoding in the first frame after being switched to the still-image region. Therefore, in the common virtual desktop server, in the first frame after being switched from the video region to the still-image region, the hardware still-image encoder performs intra-screen prediction encoding instead of inter-screen prediction encoding. For example, in the common virtual desktop server, since an intra-screen prediction encoded stream is generated in the first frame after the switching, the amount of generated information increases (see reference numeral 433).

Therefore, in the screen transfer system 100 according to the first embodiment, the virtual desktop server 110 and the user terminal 120 are formed so that the amount of generated information, which increases in the first frame after being switched from the video region to the still-image region, may be suppressed.

For example, the virtual desktop server 110 and the user terminal 120 are formed so that inter-screen prediction encoding is performed in the first frame after being switched from the video region to the still-image region. In the first embodiment, inter-screen prediction encoding is achieved by the various computing devices 211 (311) appropriately operating the hardware video encoder 212, the hardware video decoder 213 (312), the hardware still-image encoder 214 (313), and the hardware still-image decoder 215 (314). The virtual desktop server 110 and the user terminal 120 of the screen transfer system 100 according to the first embodiment are described below in detail.

<Overview of Operation of Virtual Desktop Server>

Figure 5:
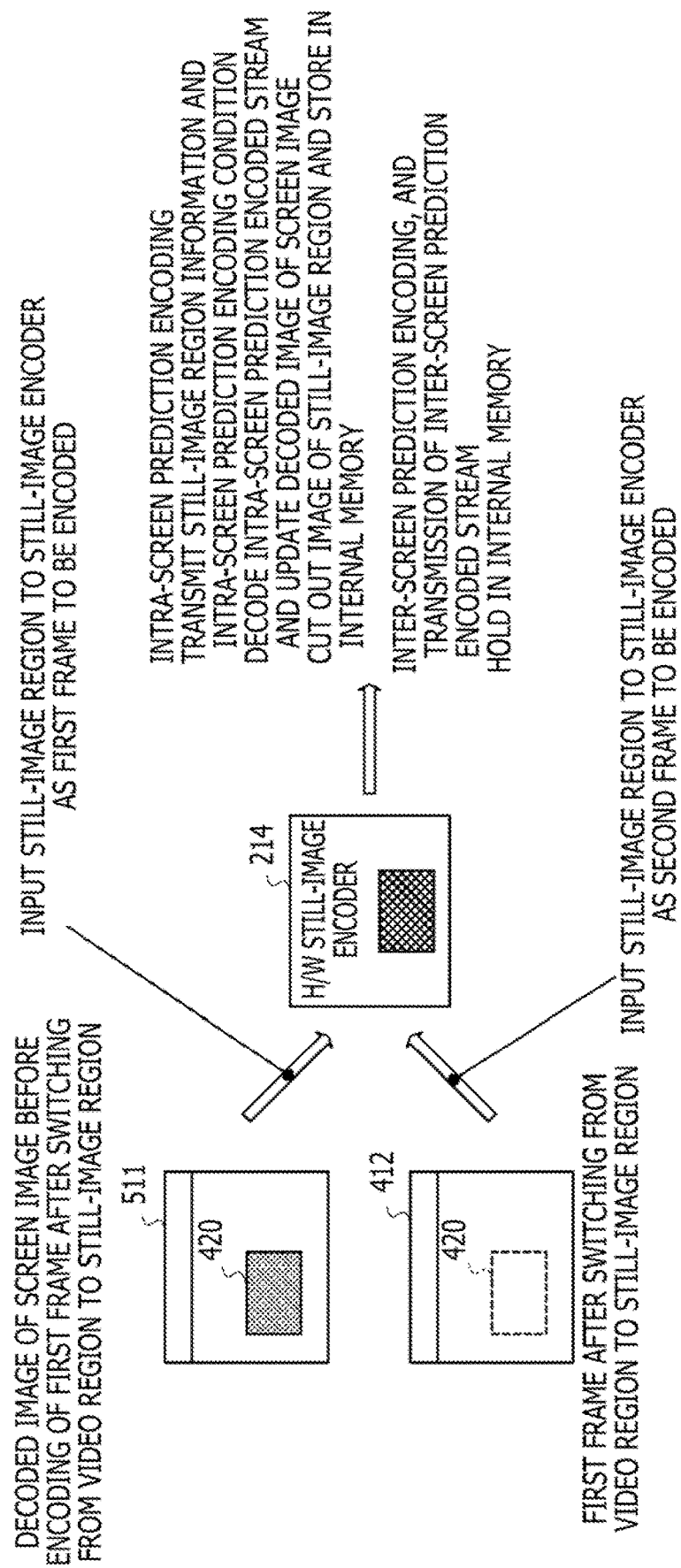
FIG. 5 is a diagram illustrating an overview of the operation of the virtual desktop server at the time of switching from the video region to the still-image region.

First, an overview of the operation of the virtual desktop server 110 at the time of switching from the video region to the still-image region will be described. FIG. 5 is a diagram illustrating an overview of the operation of the virtual desktop server at the time of switching from the video region to the still-image region.

In FIG. 5, a decoded image 511 is a decoded image obtained by decoding a screen image before encoding of the first frame after the predetermined region 420 is switched from the video region to the still-image region (decoded image obtained by decoding a video encoded stream). On the other hand, a screen image 412 is an input image of the first frame after the predetermined region 420 is switched from the video region to the still-image region.

In the virtual desktop server 110, the position of the still-image region (in this case, the position of the predetermined region 420) in the decoded image 511 is specified, and the hardware still-image encoder 214 performs intra-screen prediction encoding on the image of the still-image region in the decoded image 511. The virtual desktop server 110 transmits, to the user terminal 120, still-image region information indicating the position of the still-image region and an intra-screen prediction encoding condition. The virtual desktop server 110 decodes the intra-screen prediction encoded stream and updates the decoded image 511. The virtual desktop server 110 cuts out an image of the still-image region in the updated decoded image 511, and the hardware still-image encoder 214 holds the cut-out image in an internal memory (shaded rectangular region in FIG. 5).

This completes the advance preparation for performing inter-screen prediction encoding on the image of the still-image region of the first frame after being switched from the video region to the still-image region. The advance preparation being completed indicates a state in which an image to be referred to when performing inter-screen prediction encoding on the image of the still-image region of the first frame after the predetermined region 420 is switched from the video region to the still-image region is held in the internal memory of the hardware still-image encoder 214. However, the image to be referred to is an image that may be reproduced by the user terminal 120.

Subsequently, an image of the predetermined region 420 in the screen image 412 of the first frame after being switched from the video region to the still-image region (image of the still-image region) is input to the hardware still-image encoder 214 of the virtual desktop server 110.

When the image of the predetermined region 420 in the screen image 412 of the first frame (image of the still-image region) is input, the hardware still-image encoder 214 refers to the image of the still-image region cut out from the updated decoded image 511 held in the internal memory.

Thus, the hardware still-image encoder 214 of the virtual desktop server 110 performs inter-screen prediction encoding to generate an inter-screen prediction encoded stream. The virtual desktop server 110 transmits the generated inter-screen prediction encoded stream to the user terminal 120. The hardware still-image encoder 214 of the virtual desktop server 110 holds, in the internal memory, the image of the predetermined region 420 in the screen image 412 of the first frame (image of the still-image region).

As described above, the virtual desktop server 110 performs inter-screen prediction encoding on the image of the still-image region from the first frame after being switched from the video region to the still-image region, and transmits an inter-screen prediction encoded stream to the user terminal 120.

As a result, it is possible to suppress an increase in the amount of generated code in the first frame after being switched from the video region to the still-image region, <Overview of Functional Configuration of Virtual Desktop Server>

Figure 6:
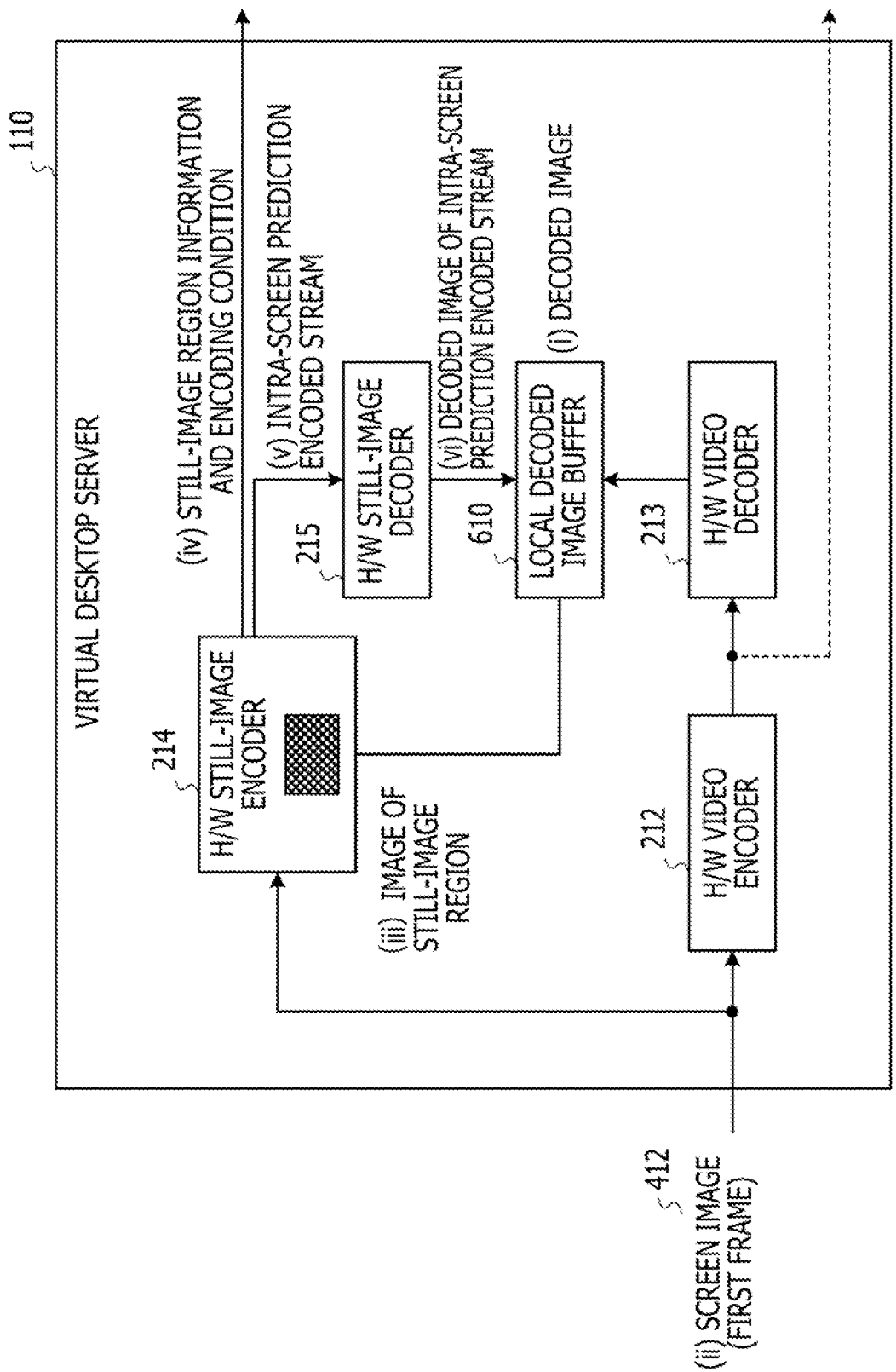
FIG. 6 is a first diagram illustrating an overview of the functional configuration of the virtual desktop server.

Next, an overview of the functional configuration (in this case, a configuration of functions mainly implemented by hardware) for implementing the above-described operation of the virtual desktop server 110 at the time of switching from the video region to the still-image region will be described. FIG. 6 is a first diagram illustrating an overview of the functional configuration of the virtual desktop server, and illustrates an overview of the functional configuration in a state before processing a screen image of the first frame after being switched from the video region to the still-image region.

As illustrated in FIG. 6, in a state before the screen image of the first frame is processed, a local decoded image buffer 610 stores the decoded image 511 obtained by decoding the screen image before encoding of the first frame after being switched from the video region to the still-image region ((i) in the figure). The local decoded image buffer 610 is an example of a decoded image storage unit, and is a buffer area secured over the memory 220 of the virtual desktop server 110. When the predetermined region 420 is switched from the video region to the still-image region ((ii) in the figure), an image of the still-image region is cut out from the decoded image 511 stored in the local decoded image buffer 610 ((iii) in the figure).

The hardware still-image encoder 214 performs intra-screen prediction encoding on the cut-out image of the still-image region to generate an intra-screen prediction encoded stream. At this time, still-image region information indicating the position of the still-image region cut out from the decoded image 511 is transmitted to the user terminal 120. An intra-screen prediction encoding condition under which the intra-screen prediction encoded stream is generated is transmitted to the user terminal 120 ((iv) in the figure).

The hardware still-image encoder 214 notifies the hardware still-image decoder 215 of the intra-screen prediction encoded stream generated by performing intra-screen prediction encoding ((v) in the figure).

The hardware still-image decoder 215 decodes the notified intra-screen prediction encoded stream, and updates the decoded image 511 ((vi) in the figure).

FIG. 7 is a second diagram illustrating an overview of the functional configuration of the virtual desktop server, and illustrates an overview of the functional configuration for processing the screen image 412 of the first frame after being switched from the video region to the still-image region.

As illustrated in FIG. 7, it is assumed that the screen image 412 of the first frame after being switched from the video region to the still-image region (hereinafter, simply referred to as the screen image 412 of the first frame) is input to the virtual desktop server 110 ((i) in the figure).

When the screen image 412 of the first frame is input, an image of the still-image region is cut out from the updated decoded image 511 stored in the local decoded image buffer 610 ((ii) in the figure). The image of the still-image region cut out at this time is the same as the decoded image of the intra-screen prediction encoded stream ((vi) in FIG. 6). The hardware still-image encoder 214 holds the cut-out image of the still-image region in the internal memory.

The image of the still-image region is cut out from the screen image 412 of the first frame ((iii) in the figure). This completes the advance preparation for performing inter-screen prediction encoding on the image of the still-image region of the first frame after being switched from the video region to the still-image region.

The hardware still-image encoder 214 performs inter-screen prediction encoding using the image of the still-image region cut out from the updated decoded image 511 and held in the internal memory, and the image of the still-image region cut out from the screen image 412 of the first frame, thereby generating an inter-screen prediction encoded stream. The hardware still-image encoder 214 holds the image of the still-image region cut out from the screen image 412 of the first frame in the internal memory.

The inter-screen prediction encoded stream generated by the hardware still-image encoder 214 is transmitted to the user terminal 120, and is notified to the hardware still-image decoder 215 ((iv) in the figure).

The hardware still-image decoder 215 generates a decoded image for the image of the still-image region of the first frame by decoding the notified inter-screen prediction encoded stream, and stores the decoded image in the local decoded image buffer 610 ((v) in the figure).

Thus, an image same as the image of the display screen displayed as the screen image of the first frame in the user terminal 120 is stored in the local decoded image buffer 610. The processing in which the hardware still-image decoder 215 decodes an inter-screen prediction encoded stream and stores the decoded inter-screen prediction encoded stream in the local decoded image buffer 610 is not an indispensable function when generating an inter-screen prediction encoded stream, and does not have to be executed, <Details of Functional Configuration of Virtual Desktop Server>

Next, the functional configuration of the virtual desktop server 110 will be described in detail. FIG. 8 is a diagram illustrating details of the functional configuration of the virtual desktop server. The virtual desktop server 110 executes screen transfer processing by functions implemented by operation of hardware and functions implemented by the various computing devices 211 executing a program (software).

In FIG. 8, a white rectangular frame represents functions implemented by operation of hardware, and a hatched rectangular frame represents functions implemented by the various computing devices 211 of the processor 210 executing a program (software). Details of the function of each unit will be described below.

An update frequency determination unit 811 acquires the screen image for each frame, and divides the acquired screen image of each frame into regions of a predetermined size (for example, 16 pixels×16 pixels). The update frequency determination unit 811 determines an update frequency for each of the divided regions.

A region determination unit 812 determines whether the update frequency determined by the update frequency determination unit 811 is equal to or higher than a predetermined threshold for each of the divided regions. The region determination unit 812 determines that a region is the video region when the update frequency for the region is equal to or higher than the predetermined threshold, and determines that a region is the still-image region when the update frequency for the region is lower than the predetermined threshold.

Based on the result of region determination, the region determination unit 812 notifies a video region cutout unit 814 of video region information, a still-image region cutout unit 816 and a client image still-image region cutout unit 817 of still-image region information, and a transmission unit 818 of the video region information and the still-image region information.

The region determination unit 812 also notifies both the still-image region cutout unit 816 and the client image still-image region cutout unit 817 of the still-image region information, for the first frame after a predetermined region in a screen image is switched from the video region to the still-image region. Even when there is a region where the video region is switched to the still-image region, if the video region is included in the screen image, video encoding is performed. Therefore, video encoding is performed on the entire screen image, and the video region cut out by the video region cutout unit 814 described later is only the region determined as the video region by the region determination unit 812.

A color difference conversion unit 813 converts the color difference format of the input screen image. For example, the color difference conversion unit 813 converts the color difference format from the 4:4:4 format to the 4:2:0 format.

Conversion from the 4:4:4 format to the 4:2:0 format means filter processing on the screen image of each frame, in which a Y component is left without any change, a U component is thinned so as to be ½ times each in vertical and horizontal directions, and a V component is thinned so as to be ½ times each in the vertical and horizontal directions.

The hardware video encoder 212 performs video encoding on the entire screen image of each frame converted into the 4:2:0 format by the color difference conversion unit 813 to generate a video encoded stream.

The hardware video encoder 212 generates a video encoded stream by using, for example, an encoding scheme conforming to a video encoding standard such as H.264, H.265/HEVC. However, the encoding scheme used by the hardware video encoder 212 to generate a video encoded stream is not limited to H.264 and H.265/HEVC.

The hardware video decoder 213 and the transmission unit 818 are notified of the video encoded stream generated by the hardware video encoder 212.

The hardware video decoder 213 decodes the video encoded stream notified by the hardware video encoder 212 to generate a full screen video-decoded image. The hardware video decoder 213 notifies a full screen video-decoded image frame buffer 810 of the generated full screen video-decoded image. The full screen video-decoded image frame buffer 810 is a buffer area secured over the memory 220 of the virtual desktop server 110.

The full screen video-decoded image frame buffer 810 stores the full screen video-decoded image notified by the hardware video decoder 213.

The video region cutout unit 814 reads the full screen video-decoded image stored in the full screen video-decoded image frame buffer 810 when the video region information is notified by the region determination unit 812, and cuts out an image of the video region. The video region cutout unit 814 notifies a color difference conversion unit 815 of the cut-out image of the video region.

The color difference conversion unit 815 converts the color difference format for the video region cut out by the video region cutout unit 814. For example, the color difference conversion unit 815 converts the color difference format from the 4:2:0 format to the 4:4:4 format.

Conversion from the 4:2:0 format to the 4:4:4 format means processing on the image of the video region, in which a Y component is left without any change, a U component is interpolated so as to be two times each in vertical and horizontal directions, and a V component is interpolated so as to be two times each in the vertical and horizontal directions.

The color difference conversion unit 815 notifies the local decoded image buffer 610 of the full screen video-decoded image including the image of the video region for which the color difference format has been converted (video region decoded image).

The local decoded image buffer 610 stores the full screen video-decoded image including the video region decoded image notified from the color difference conversion unit 815 and the decoded image of the still-image region notified from the hardware still-image decoder 215. Thus, the decoded image of the screen image is stored in the local decoded image buffer 610.

The still-image region cutout unit 816 operates in a case where still-image region information is notified by the region determination unit 812. For example, the still-image region cutout unit 816 cuts out an image of the still-image region specified by the still-image region information from the input screen image. The still-image region cutout unit 816 notifies the hardware still-image encoder 214 of the image of the still-image region cut out from the screen image.

The client image still-image region cutout unit 817 cuts out an image of the still-image region from the decoded image obtained by decoding the screen image before encoding of the first frame after being switched from the video region to the still-image region, which is stored in the local decoded image buffer 610. The client image still-image region cutout unit 817 cuts out an image of the still-image region from the updated decoded image stored in the local decoded image buffer 610. The client image still-image region cutout unit 817 notifies the hardware still-image encoder 214 of the cut-out image of the still-image region.

In a case where the video region is switched to the still-image region, the hardware still-image encoder 214 performs intra-screen prediction encoding on the image of the still-image region cut out from the decoded image obtained by decoding the screen image before encoding of the first frame. The hardware still-image encoder 214 notifies the hardware still-image decoder 215 of an intra-screen prediction encoded stream and notifies the transmission unit 818 of an intra-screen prediction encoding condition.

The hardware still-image encoder 214 holds the image of the still-image region cut out from the updated decoded image in the internal memory.

The hardware still-image encoder 214 performs inter-screen prediction encoding on the image of the still-image region cut out by the still-image region cutout unit 816. For example, the hardware still-image encoder 214 performs inter-screen prediction encoding by using, as a reference image, the image of the still-image region cut out from the updated decoded image held in the internal memory.

The hardware still-image encoder 214 notifies the hardware still-image decoder 215 and the transmission unit 818 of an inter-screen prediction encoded stream.

The hardware still-image decoder 215 decodes the intra-screen prediction encoded stream or the inter-screen prediction encoded stream notified by the hardware still-image encoder 214 to generate a decoded image of the still-image region. The hardware still-image encoder 214 stores the generated decoded image of the still-image region in the local decoded image buffer 610.

The transmission unit 818 transmits, to the user terminal 120, the video encoded stream notified by the hardware video encoder 212, the intra-screen prediction encoding condition notified by the hardware still-image encoder 214, the inter-screen prediction encoded stream notified by the hardware still-image encoder 214, and the video region information and the still-image region information notified by the region determination unit 812.

<Flow of Screen Transfer Processing in Virtual Desktop Server>

Figure 9A:
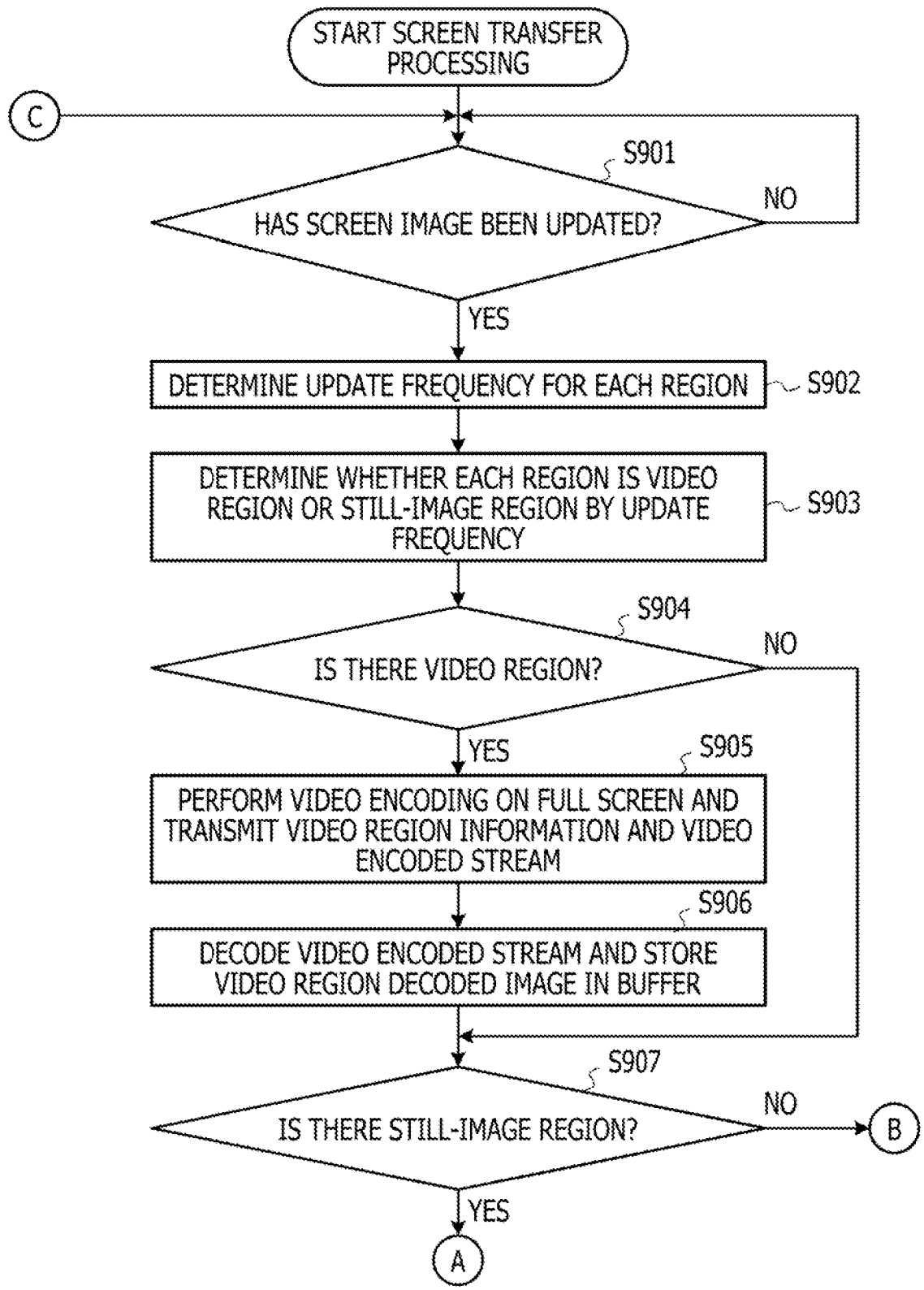
FIGS. 9A and 9B are a first flowchart illustrating the flow of screen transfer processing in the virtual desktop server.
Figure 9B:
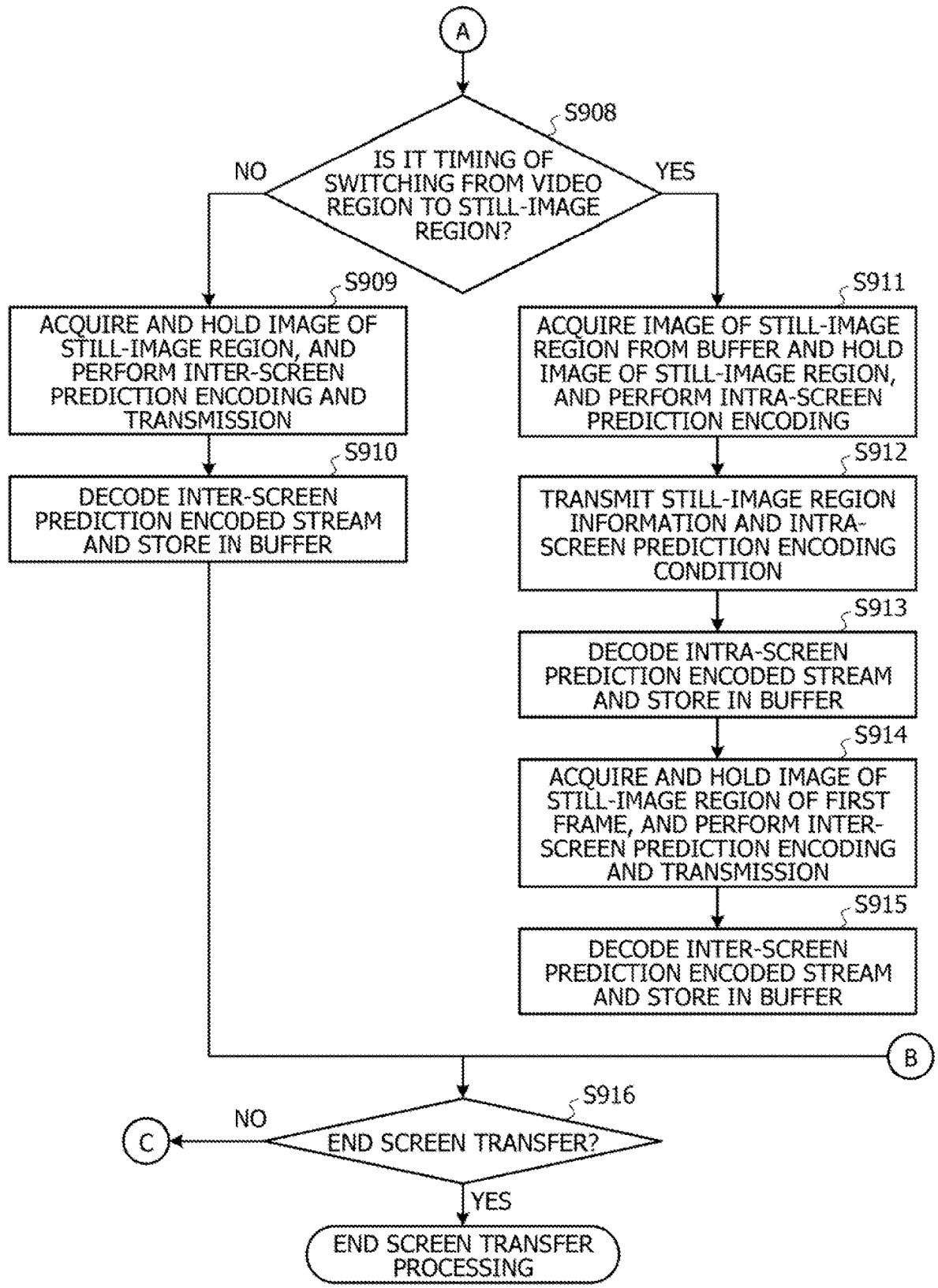

Next, the flow of screen transfer processing in the virtual desktop server 110 will be described. FIGS. 9A and 9B are a first flowchart illustrating the flow of screen transfer processing in the virtual desktop server.

In step S901, the update frequency determination unit 811 determines whether a screen image is newly input or updated to the next frame. When it is determined in step S901 that a screen image is not newly input or not updated to the next frame (in a case of NO in step S901), the processing returns to step S901 and waits.

On the other hand, when it is determined in step S901 that a screen image is newly input or updated to the next frame (in a case of YES in step S901), the processing proceeds to step S902.

In step S902, the update frequency determination unit 811 determines an update frequency for each region having a predetermined size in the screen image acquired in units of frames.

In step S903, the region determination unit 812 determines whether each region is the video region or the still-image region based on the update frequency determined in step S902.

In step S904, the region determination unit 812 determines whether there is a region determined to be the video region in the screen image. When it is determined in step S904 that there is no region determined to be the video region (in a case of NO in step S904), the processing proceeds to step S907.

On the other hand, when it is determined in step S904 that there is a region determined to be the video region (in a case of YES in step S904), the processing proceeds to step S905.

In step S905, the color difference conversion unit 813 converts the color difference format for the input screen image or the screen image updated to the next frame. The hardware video encoder 212 performs video encoding on the screen image with the converted color difference format to generate a video encoded stream. The transmission unit 818 transmits the video region information and the video encoded stream to the user terminal 120.

In step S906, the hardware video decoder 213 decodes the video encoded stream to generate a full screen video-decoded image, and stores the full screen video-decoded image in the full screen video-decoded image frame buffer 810. The video region cutout unit 814 cuts out an image of the video region from the full screen video-decoded image based on the video region information, and the color difference conversion unit 815 generates a video region decoded image by converting the color difference format. The color difference conversion unit 815 stores the full screen video-decoded image including the video region decoded image in the local decoded image buffer 610.

In step S907, the region determination unit 812 determines whether there is a region determined to be the still-image region. When it is determined in step S907 that there is no region determined to be the still-image region (in a case of NO in step S907), the processing proceeds to step S916.

On the other hand, when it is determined in step S907 that there is a region determined to be the still-image region (in a case of YES in step S907), the processing proceeds to step S908.

In step S908, the region determination unit 812 determines whether it is a timing of switching from the video region to the still-image region. When it is determined in step S908 that it is not the timing of switching (in a case of NO in step S908), the processing proceeds to step S909.

In step S909, the still-image region cutout unit 816 cuts out an image of the still-image region from the input screen image or the screen image updated to the next frame. The hardware still-image encoder 214 performs inter-screen prediction encoding by referring to the image of the still-image region of the input image one frame before held in the internal memory, and generates an inter-screen prediction encoded stream. The transmission unit 818 transmits the still-image region information and the inter-screen prediction encoded stream to the user terminal 120.

In step S910, the hardware still-image decoder 215 decodes the inter-screen prediction encoded stream, and stores the decoded image of the still-image region in the local decoded image buffer 610.

On the other hand, when it is determined in step S908 that it is the timing of switching (in a case of YES in step S908), the processing proceeds to step S911.

In step S911, the client image still-image region cutout unit 817 cuts out an image of the still-image region from the decoded image of the screen image before encoding of the first frame after the switching, which is stored in the local decoded image buffer 610. The hardware still-image encoder 214 performs intra-screen prediction encoding on the image of the still-image region cut out by the client image still-image region cutout unit 817, and generates an intra-screen prediction encoded stream.

In step S912, the transmission unit 818 transmits the still-image region information and the intra-screen prediction encoding condition to the user terminal 120.

In step S913, the hardware still-image decoder 215 decodes the intra-screen prediction encoded stream and updates the decoded image of the screen image stored in the local decoded image buffer 610. The client image still-image region cutout unit 817 cuts out an image of the still-image region from the updated decoded image, and notifies the hardware still-image encoder 214 of the cut-out image. Thus, the hardware still-image encoder 214 holds the image of the still-image region cut out from the updated decoded image in the internal memory.

In step S914, the still-image region cutout unit 816 cuts out an image of the still-image region from the screen image of the first frame. The hardware still-image encoder 214 refers to the image of the still-image region cut out from the updated decoded image held in the internal memory, and performs inter-screen prediction encoding. Thus, the hardware still-image encoder 214 generates an inter-screen prediction encoded stream for the image of the still-image region of the screen image of the first frame. The hardware still-image encoder 214 holds the image of the still-image region cut out from the screen image of the first frame in the internal memory. The transmission unit 818 transmits, to the user terminal 120, the still-image region information on the still-image region of the screen image of the first frame and the inter-screen prediction encoded stream.

In step S915, the hardware still-image decoder 215 generates a decoded image of the still-image region by decoding the inter-screen prediction encoded stream for the image of the still-image region of the screen image of the first frame, and stores the generated decoded image in the local decoded image buffer 610.

In step S916, the virtual desktop server 110 determines whether to end the screen transfer processing. When it is determined in step 3916 not to end the screen transfer processing (in a case of NO in step S916), the processing returns to step S901.

On the other hand, when it is determined in step S916 to end the screen transfer processing (in a case of YES in S916), the screen transfer processing ends.

<Overview of Operation of User Terminal>

Figure 10:
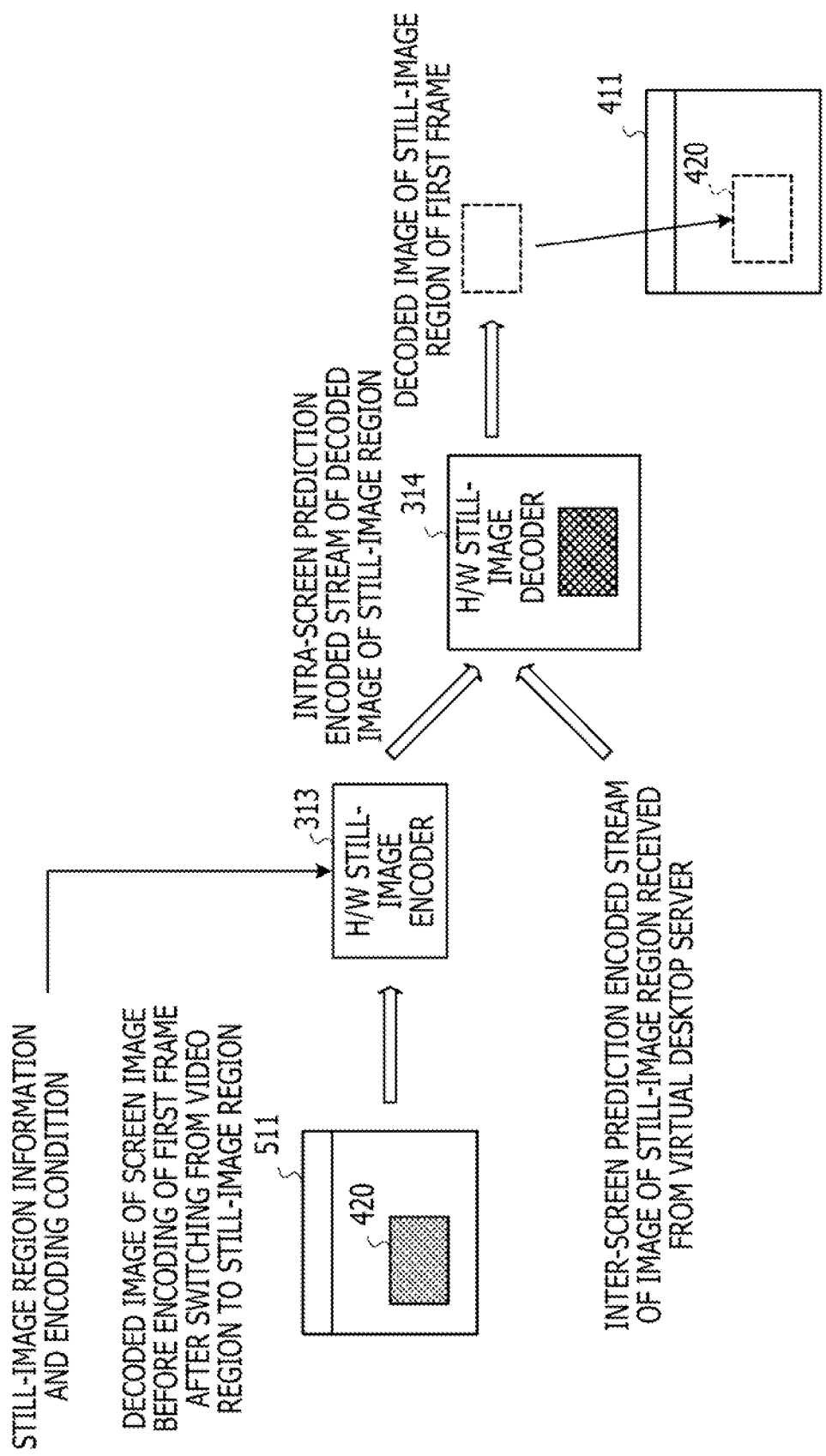
FIG. 10 is a diagram illustrating an overview of the operation of the user terminal at the time of switching from the video region to the still-image region.

Next, an overview of the operation of the user terminal 120 at the time of switching from the video region to the still-image region will be described. FIG. 10 is a diagram illustrating an overview of the operation of the user terminal at the time of switching from the video region to the still-image region.

In FIG. 10, the decoded image 511 is a decoded image obtained by decoding the screen image before encoding of the first frame after the predetermined region 420 is switched from the video region to the still-image region. For example, a screen image 411 is an image decoded by the hardware video decoder 312 of the user terminal 120 from a video encoded stream generated by the hardware video encoder 212 of the virtual desktop server 110 performing video encoding.

The hardware still-image encoder 313 of the user terminal 120 cuts out an image of the still-image region from the decoded image 511, and performs intra-screen prediction encoding. The hardware still-image encoder 313 performs intra-screen prediction encoding based on the still-image region information and encoding condition transmitted from the virtual desktop server 110.

The hardware still-image encoder 313 notifies the hardware still-image decoder 314 of an intra-screen prediction encoded stream generated by performing the intra-screen prediction encoding.

The hardware still-image decoder 314 decodes the intra-screen prediction encoded stream notified by the hardware still-image encoder 313. Thus, the hardware still-image decoder 314 generates a decoded image of the still-image region, and holds the decoded image in the internal memory (shaded rectangular region in FIG. 10) of the hardware still-image decoder 314.

The hardware still-image decoder 314 decodes an inter-screen prediction encoded stream received from the virtual desktop server 110. For example, with respect to the image of the still-image region of the screen image 412 of the first frame, the inter-screen prediction encoded stream generated by the hardware still-image encoder 214 of the virtual desktop server 110 performing inter-screen prediction encoding is decoded. At this time, the hardware still-image decoder 314 decodes the inter-screen prediction encoded stream by referring to the decoded image of the still-image region held in the internal memory of the hardware stilt-image decoder 314.

The hardware still-image decoder 314 holds the decoded image of the still-image region for the screen image 412 of the first frame in the internal memory, and stores the decoded image in a decoded image buffer.

As described above, in the user terminal 120, the hardware still-image decoder 314 refers to the decoded image of the still-image region held in the internal memory before decoding the first frame. Thus, the user terminal 120 may decode the inter-screen prediction encoded stream from the first frame.

<Overview of Functional Configuration of User Terminal>

Figure 11:
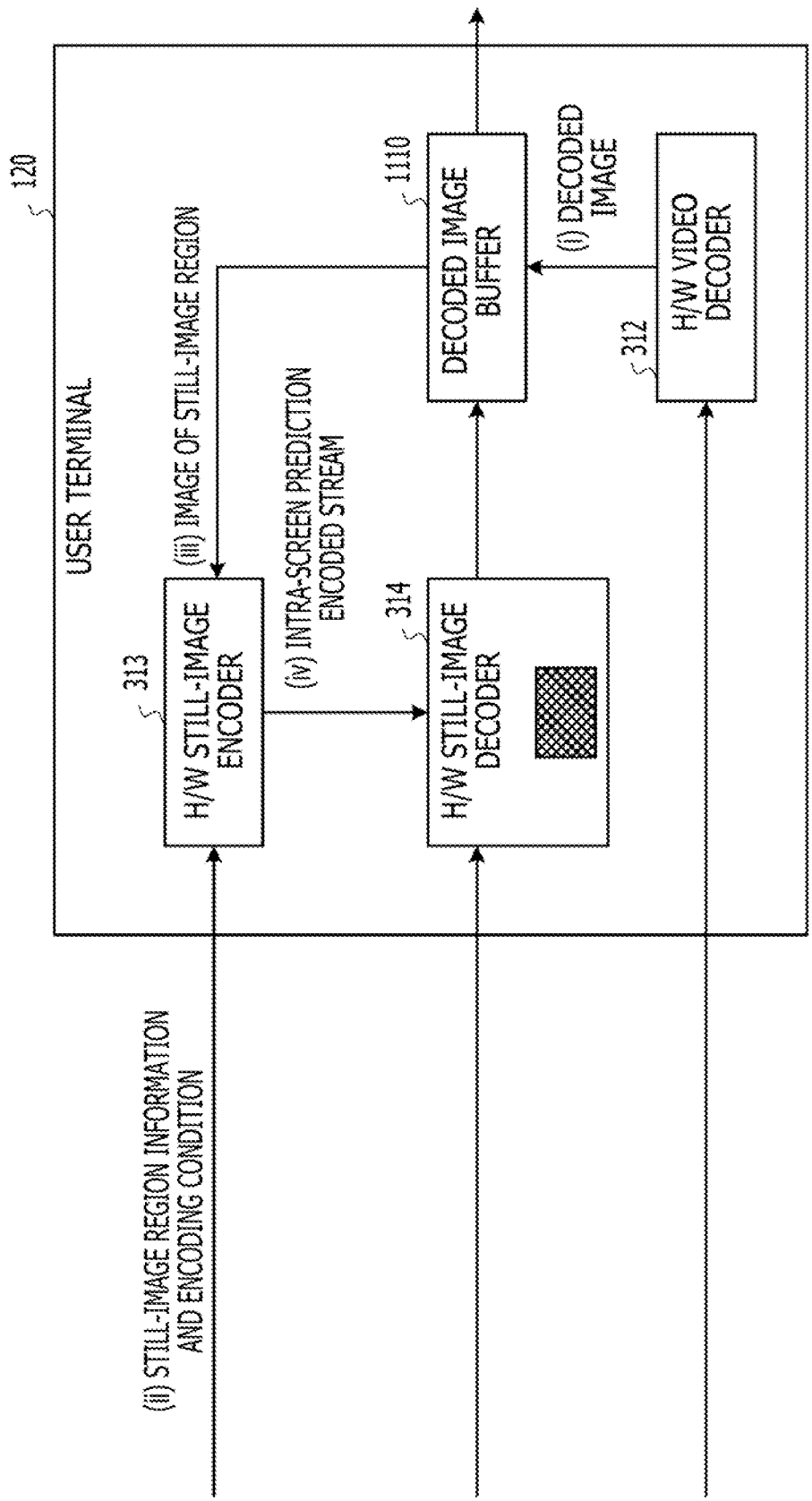
FIG. 11 is a first diagram illustrating an overview of the functional configuration of the user terminal.

Next, an overview of the functional configuration (in this case, a configuration of functions mainly implemented by hardware) for implementing the above-described operation of the user terminal 120 at the time of switching from the video region to the still-image region will be described. FIG. 11 is a first diagram illustrating an overview of the functional configuration of the user terminal, and illustrates an overview of the functional configuration in a state before processing an inter-screen prediction encoded stream of the first frame after being switched from the video region to the still-image region.

As illustrated in FIG. 11, in a state before the screen image of the first frame is processed, the decoded image 511 obtained by decoding the screen image before encoding of the first frame after being switched from the video region to the still-image region is stored in a decoded image buffer 1110 ((i) in the figure). The decoded image buffer 1110 is a buffer area secured over a memory 320 of the user terminal 120.

When still-image region information is transmitted from the virtual desktop server 110 ((ii) in the figure), an image of the still-image region is cut out from the decoded image 511 stored in the decoded image buffer 1110 ((iii) in the figure).

The hardware still-image encoder 313 receives the intra-screen prediction encoding condition from the virtual desktop server 110. Based on the received encoding condition, the hardware still-image encoder 313 performs intra-screen prediction encoding on the cut-out image of the still-image region, and generates an intra-screen prediction encoded stream ((iv) in the figure). The hardware still-image encoder 313 notifies the hardware still-image decoder 314 of the generated intra-screen prediction encoded stream.

The hardware still-image decoder 314 generates a decoded image of the still-image region by decoding the intra-screen prediction encoded stream notified by the hardware still-image encoder 313, and holds the decoded image in the internal memory of the hardware still-image decoder 314. This completes the advance preparation for performing inter-screen prediction encoding on the image of the still-image region of the first frame after being switched from the video region to the still-image region, FIG. 12 is a second diagram illustrating an overview of the functional configuration of the user terminal, and illustrates an overview of the functional configuration for processing an inter-screen prediction encoded stream for the screen image 412 of the first frame after being switched from the video region to the still-image region.

Figure 12:
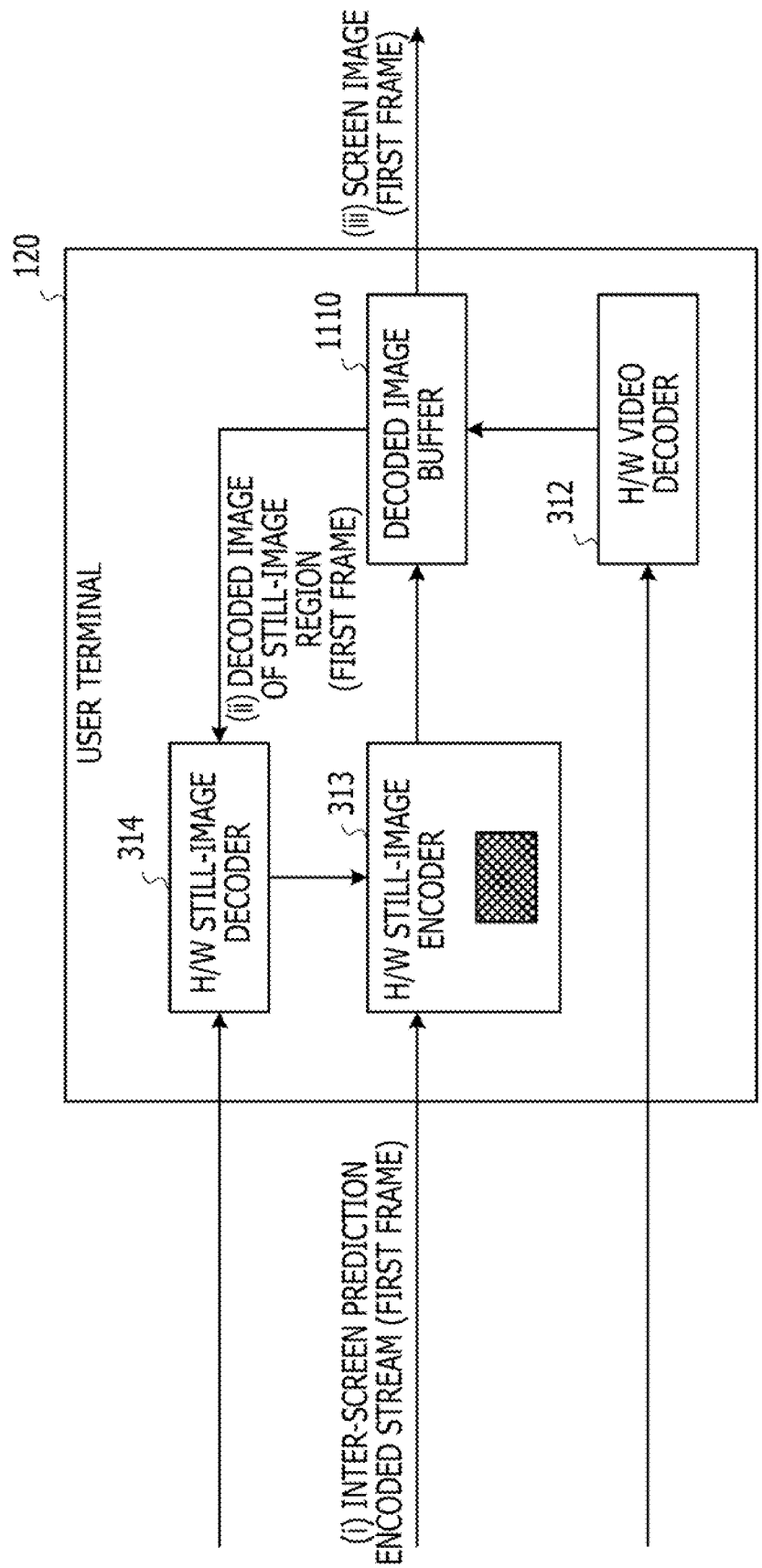
FIG. 12 is a second diagram illustrating the overview of the functional configuration of the user terminal.

As illustrated in FIG. 12, the user terminal 120 receives an inter-screen prediction encoded stream for the screen image 412 of the first frame from the virtual desktop server 110 ((i) in the figure). As described above, the hardware still-image decoder 314 holds the decoded image of the still-image region of the decoded image 511 in the internal memory. Therefore, the hardware still-image decoder 314 refers to the decoded image of the still-image region of the decoded image 511 to decode the inter-screen prediction encoded stream for the screen image 412 of the first frame.

The hardware still-image decoder 314 stores the decoded image of the still-image region for the screen image 412 of the first frame, which is generated by decoding the inter-screen prediction encoded stream, in the decoded image buffer 1110 ((ii) in the figure).

Thus, a screen image including the decoded image 511 of the screen image before encoding of the first frame and the decoded image of the still-image region for the screen image 412 of the first frame is displayed on a UI device 340 of the user terminal 120 ((iii) in the figure), <Details of Functional Configuration of User Terminal>

Figure 13:
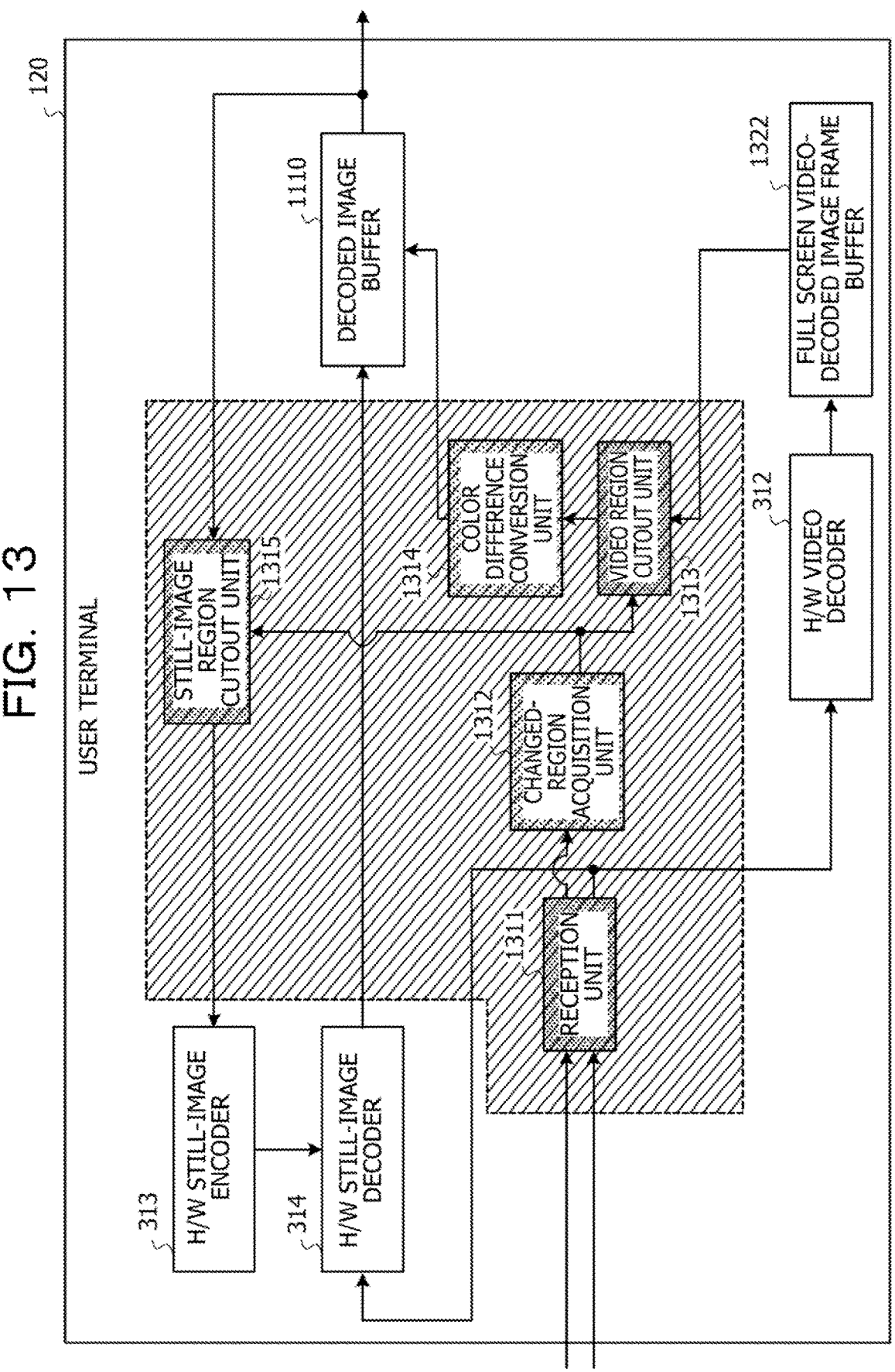
FIG. 13 is a diagram illustrating details of the functional configuration of the user terminal.

Next, the functional configuration of the user terminal 120 will be described in detail. FIG. 13 is a diagram illustrating details of the functional configuration of the user terminal. The user terminal 120 executes screen transfer processing by functions implemented by operation of hardware and functions implemented by various computing devices 311 executing software (program).

In FIG. 13, a white rectangular frame represents functions implemented by operation of hardware, and a hatched rectangular frame represents functions implemented by the various computing devices 311 of a processor 310 executing software (program), Details of the function of each unit will be described below.

A reception unit 1311 receives a video encoded stream, an inter-screen prediction encoded stream, video region information and still-image region information, and an encoding condition for each frame from the virtual desktop server 110. The reception unit 1311 notifies the hardware video decoder 312 of the received video encoded stream, notifies the hardware still-image decoder 314 of the received inter-screen prediction encoded stream, and notifies a changed-region acquisition unit 1312 of the video region information and the still-image region information, and the encoding condition.

The changed-region acquisition unit 1312 notifies a video region cutout unit 1313 of the video region information, and notifies a still-image region cutout unit 1315 of the still-image region information. The changed-region acquisition unit 1312 notifies the still-image region cutout unit 1315 of the encoding condition.

The hardware video decoder 312 generates a full screen video-decoded image by decoding the video encoded stream, and notifies a full screen video-decoded image frame buffer 1322 of the full screen video-decoded image. The full screen video-decoded image frame buffer 1322 is a buffer area secured over the memory 320 of the user terminal 120.

The full screen video-decoded image frame buffer 1322 stores the full screen video-decoded image notified by the hardware video decoder 312.

The video region cutout unit 1313 cuts out an image of the video region from the full screen video-decoded image stored in the full screen video-decoded image frame buffer 1322, based on the video region information notified by the changed-region acquisition unit 1312. The video region cutout unit 1313 notifies a color difference conversion unit 1314 of the cut-out image of the video region.

The color difference conversion unit 1314 converts the color difference format for the image of the video region notified by the video region cutout unit 1313. For example, the color difference conversion unit 1314 converts the color difference format from the 4:2:0 format to the 4:4:4 format.

The color difference conversion unit 1314 notifies the decoded image buffer 1110 of the full screen video-decoded image including the image of the video region (video region decoded image) for which the color difference format has been converted.

The decoded image buffer 1110 stores the full screen video-decoded image including the video region decoded image notified from the color difference conversion unit 1314 and the decoded image of the still-image region notified from the hardware still-image decoder 314. Thus, the decoded image of the screen image is stored in the decoded image buffer 1110.

The hardware still-image encoder 313 reads a decoded image obtained by decoding the screen image before encoding of the first frame after being switched from the video region to the still-image region, which is stored in the decoded image buffer 1110. The hardware still-image encoder 313 cuts out, from the read decoded image of the screen image, an image of the still-image region corresponding to the still-image region information notified from the changed-region acquisition unit 1312. The still-image region cutout unit 1315 notifies the hardware still-image encoder 313 of the cut-out image of the still-image region. The still-image region cutout unit 1315 notifies the hardware still-image encoder 313 of the encoding condition notified from the changed-region acquisition unit 1312.

The hardware still-image encoder 313 performs the intra-screen prediction encoding on the image of the still-image region notified from the still-image region cutout unit 1315 based on the encoding condition notified from the still-image region cutout unit 1315, thereby generating an intra-screen prediction encoded stream. The hardware still-image encoder 313 notifies the hardware still-image decoder 314 of the generated intra-screen prediction encoded stream.

The hardware still-image decoder 314 generates a decoded image of the still-image region by decoding the intra-screen prediction encoded stream notified from the hardware still-image encoder 313, and holds the decoded image in the internal memory.

The hardware still-image decoder 314 receives the inter-screen prediction encoded stream notified by the reception unit 1311, and decodes the inter-screen prediction encoded stream by referring to the decoded image of the still-image region held in the internal memory of the hardware still-image decoder 314. The hardware still-image decoder 314 holds a decoded image of the still-image region generated by decoding the inter-screen prediction encoded stream in the internal memory, and stores the decoded image in the decoded image buffer 1110.

<Flow of Screen Transfer Processing in User Terminal>

Figure 14A:
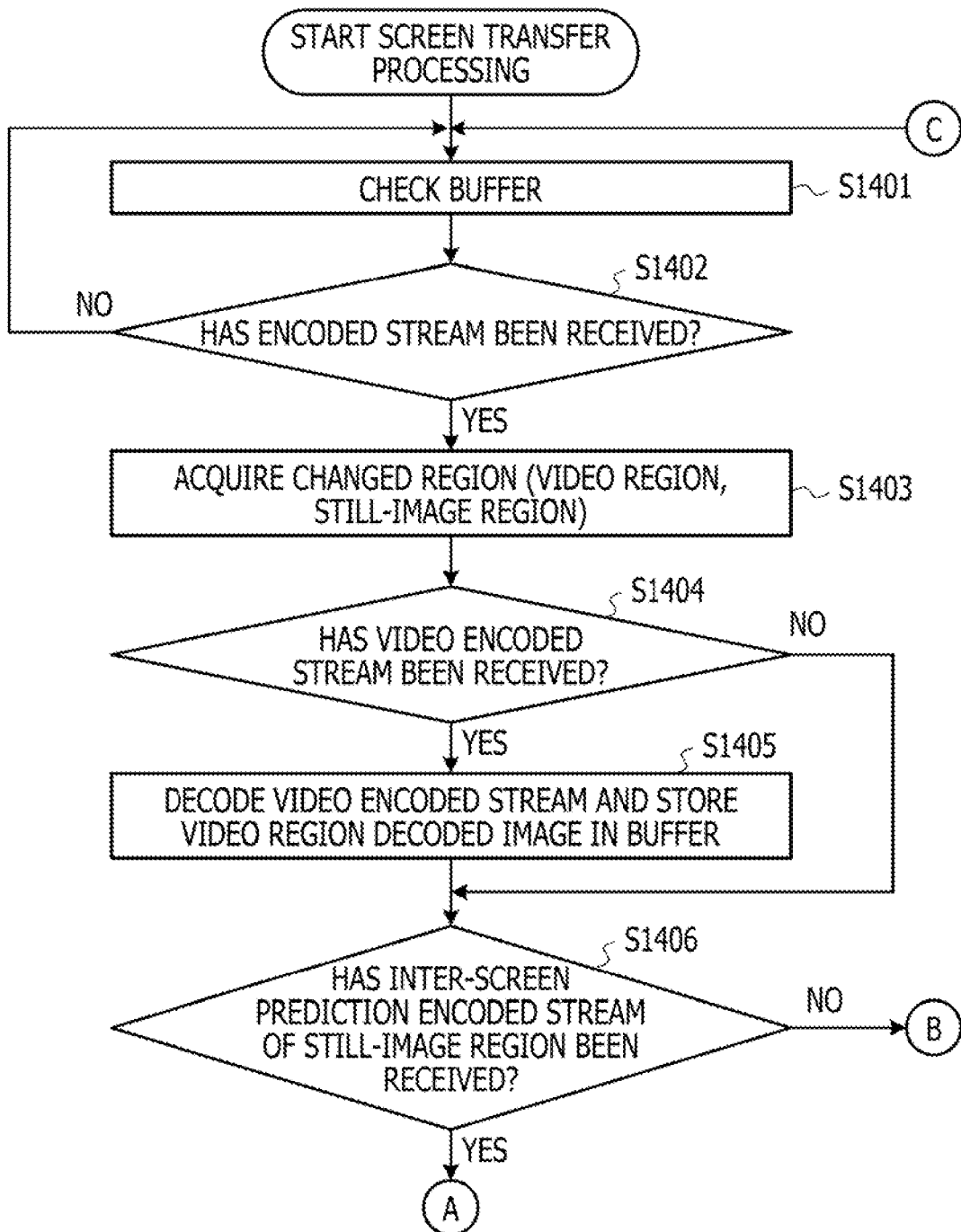

Next, a flow of screen transfer processing in the user terminal 120 will be described. FIGS. 14A and 14B are a first flowchart illustrating the flow of screen transfer processing in the user terminal.

In step S1401, the reception unit 1311 checks the buffer in which to store a video encoded stream or the like transmitted from the virtual desktop server 110.

In step S1402, the reception unit 1311 determines, based on the checking result, whether a video encoded stream, still-image encoded stream, or the like has been received from the virtual desktop server 110. When it is determined in step S1402 that the video encoded stream, still-image encoded stream, or the like has not been received (in a case of NO in step S1402), the processing waits until it is determined that the video encoded stream, still-image encoded stream, or the like has been received.

On the other hand, when it is determined in step S1402 that the video encoded stream or the like has been received (in a case of YES in step S1402), the processing proceeds to step S1403.

In step S1403, the changed-region acquisition unit 1312 acquires video region information and still-image region information.

In step S1404, the reception unit 1311 determines whether a video encoded stream has been received. When it is determined in step S1404 that the video encoded stream has been received (in a case of YES in step S1404), the processing proceeds to step S1405.

In step S1405, the hardware video decoder 312 decodes the video encoded stream and stores the decoded video encoded stream in the full screen video-decoded image frame buffer 1322. The video region cutout unit 1313 cuts out an image of the video region from the full screen video-decoded image based on the video region information, and the color difference conversion unit 1314 converts the color difference format. Thus, the video region cutout unit 1313 stores the full screen video-decoded image including the video region decoded image in the decoded image buffer 1110.

On the other hand, when it is determined in step S1404 that the video encoded stream has not been received (in a case of NO in step S1404), the processing directly proceeds to step S1406.

In step S1406, the reception unit 1311 determines whether a still-image (inter-screen prediction) encoded stream has been received. When it is determined in step S1406 that the still-image (inter-screen prediction) encoded stream has not been received (in a case of NO in step S1406), the processing proceeds to step S1415.

On the other hand, when it is determined in step S1406 that the inter-screen prediction encoded stream has been received (in a case of YES in step S1406), the processing proceeds to step S1407.

In step S1407, the changed-region acquisition unit 1312 determines whether it is a timing of switching from the video region to the still-image region. When it is determined in step S1407 that it is not the timing of switching (in a case of NO in step S1407), the processing proceeds to step S1408.

In step S1408, the hardware still-image decoder 314 performs inter-screen prediction encoding on the inter-screen prediction encoded stream to decode the inter-screen prediction encoded stream, and generates a decoded image of the still-image region. The hardware still-image decoder 314 holds the generated decoded image of the still-image region in the internal memory.

In step S1409, the hardware still-image decoder 314 stores the generated decoded image of the still-image region in the decoded image buffer 1110. Thus, a screen image is generated. The generated screen image is displayed on the UI device 340.

On the other hand, when it is determined in step S1407 that it is the timing of switching (in a case of YES in step S1407), the processing proceeds to step S1411.

In step S1411, the still-image region cutout unit 1315 cuts out an image of the still-image region from the decoded image of the screen image before encoding of the first frame, which is stored in the decoded image buffer 1110. The hardware still-image encoder 313 generates an intra-screen prediction encoded stream by performing intra-screen prediction encoding on the cut-out image of the still-image region.

In step S1412, the hardware still-image decoder 314 decodes the intra-screen prediction encoded stream generated by performing intra-screen prediction encoding to generate a decoded image of the still-image region. The hardware still-image decoder 314 holds the generated decoded image of the still-image region in the internal memory.

In step S1413, the hardware still-image decoder 314 receives an inter-screen prediction encoded stream for the screen image of the first frame. The hardware still-image decoder 314 decodes the inter-screen prediction encoded stream for the image of the still-image region of the screen image of the first frame by referring to the decoded image of the still-image region held in the internal memory of the hardware still-image decoder 314. The hardware still-image decoder 314 holds, in the internal memory, a decoded image of the still-image region generated by decoding the inter-screen prediction encoded stream for the image of the still-image region of the screen image of the first frame.

In step S1414, the hardware still-image decoder 314 stores the generated decoded image of the still-image region in the decoded image buffer 1110. Thus, a screen image of the first frame is generated. The generated screen image is displayed on the UI device 340.

In step S1415, the user terminal 120 determines whether to end the screen transfer processing. When it is determined in step 31415 not to end the screen transfer processing (in a case of NO in step S1415), the processing returns to step S1401.

On the other hand, when it is determined in step S1415 to end the screen transfer processing (in a case of YES in step S1415), the screen transfer processing ends.

As is apparent from the above description, the virtual desktop server 110 according to the first embodiment: cuts out an image of the still-image region from the decoded image of the screen image generated by using the video encoded stream for the screen image before the predetermined region is switched from the video region to the still-image region; performs intra-screen prediction encoding on the cut-out image of the still-image region to generate an intra-screen prediction encoded stream; decodes the intra-screen prediction encoded stream, and stores the decoded image in the local decoded image buffer; and performs inter-screen prediction encoding on an image of the still-image region cut out from the screen image of the first frame after the predetermined region is switched from the video region to the still-image region, when the screen image after the switching is input, and generates an inter-screen prediction encoded stream. At this time, the decoded image stored in the local decoded image buffer is referred to.

The user terminal 120 according to the first embodiment: cuts out an image of the still-image region from the decoded image of the screen image generated by using the video encoded stream for the screen image before the predetermined region is switched from the video region to the still-image region; performs intra-screen prediction encoding on the cut-out image of the still-image region to generate an intra-screen prediction encoded stream; decodes the intra-screen prediction encoded stream, and generates a decoded image of the still-image region of the screen image before the switching; and decodes an inter-screen prediction encoded stream for the still-image region of the screen image of the first frame after the predetermined region is switched from the video region to the still-image region, when the inter-screen prediction encoded stream is input. At this time, the decoded image of the still-image region of the screen image before the switching is referred to.

As described above, the virtual desktop server according to the first embodiment performs inter-screen prediction encoding on the image of the still-image region of the screen image of the first frame after being switched from the video region to the still-image region. The user terminal according to the first embodiment decodes an inter-screen prediction encoded stream for the still-image region of the screen image of the first frame after being switched from the video region to the still-image region.

Thus, according to the first embodiment, it is possible to suppress an increase in the amount of generated code in the first frame after being switched from the video region to the still-image region.

For example, according to the first embodiment, it is possible to suppress the amount of information generated when encoding an image of the still-image region of the screen image.

Second Embodiment

According to the above-described first embodiment, there has been described a method of suppressing an increase in the amount of generated information in the first frame after being switched from the video region to the still-image region, by performing, in the processing of the first frame after being switched from the video region to the still-image region, intra-screen prediction encoding, transmission of still-image region information and encoding condition, inter-screen prediction encoding, and transmission of an inter-screen prediction encoded stream.

However, a method of suppressing an increase in the amount of generated information in the first frame after being switched from the video region to the still-image region is not limited to the above method. For example, an increase in the amount of generated information in the first frame after being switched from the video region to the still-image region may be suppressed by performing intra-screen prediction encoding and transmission of still-image region information and encoding condition in the processing of the first frame after being switched from the video region to the still-image region, and by performing inter-screen prediction encoding and transmission of an inter-screen prediction encoded stream in the processing of the second frame after being switched from the video region to the still-image region. Hereinafter, the second embodiment is described by focusing on a difference from the above-described first embodiment.

<Flow of Screen Transfer Processing in Virtual Desktop Server>

Figure 15A:
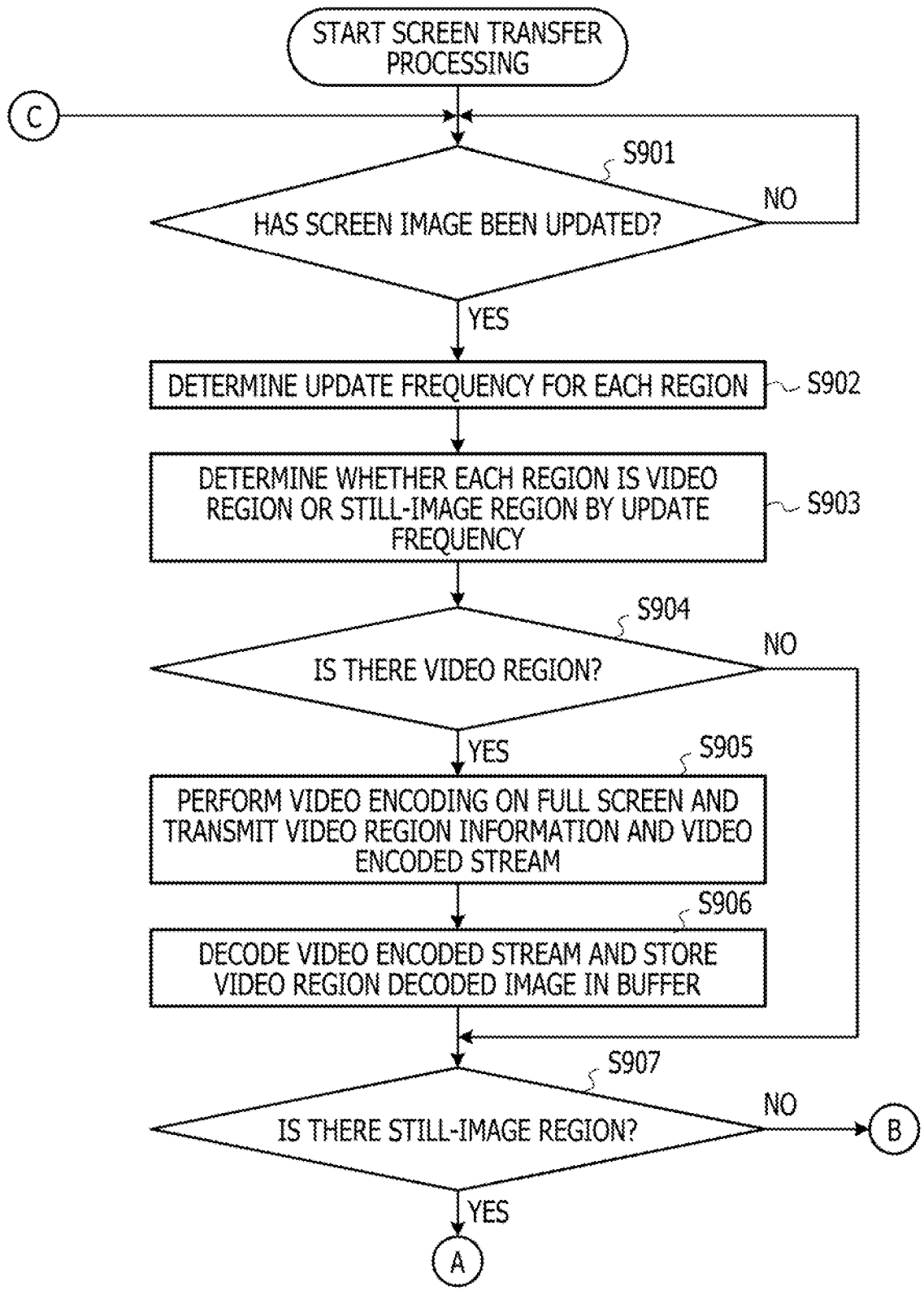
FIGS. 15A and 15B are a second flowchart illustrating the flow of screen transfer processing in the virtual desktop server.
Figure 15B:
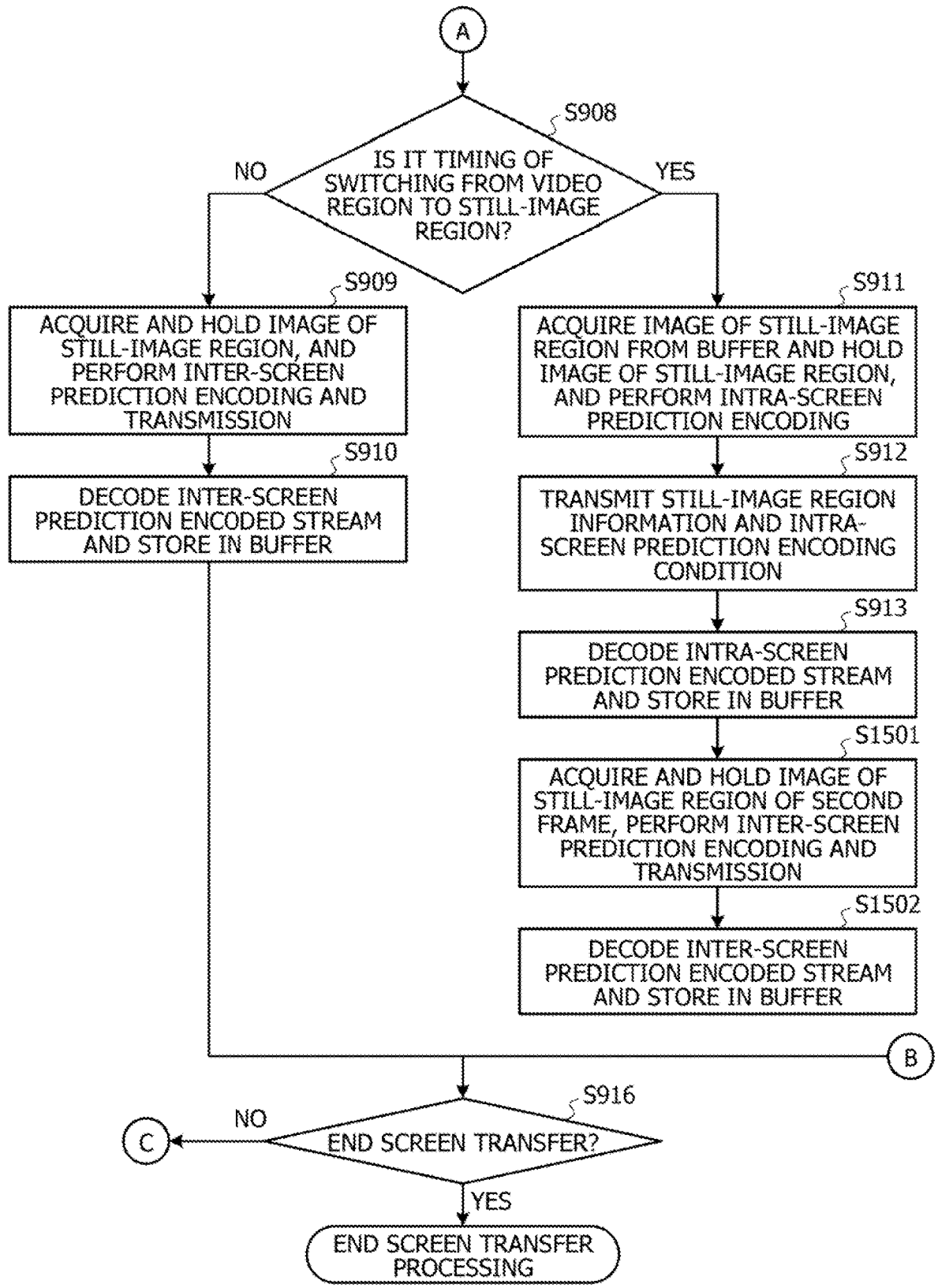

FIGS. 15A and 15B are a second flowchart illustrating the flow of screen transfer processing in the virtual desktop server. The difference from FIGS. 9A and 9B are that it includes step S1501 and step S1502.

In step S1501, the still-image region cutout unit 816 cuts out an image of the still-image region from the screen image of the second frame. The hardware still-image encoder 214 refers to the image of the still-image region cut out from the updated decoded image held in the internal memory, and performs inter-screen prediction encoding. Thus, the hardware still-image encoder 214 generates an inter-screen prediction encoded stream for the image of the still-image region of the screen image of the second frame. The hardware still-image encoder 214 holds the image of the still-image region cut out from the screen image of the second frame in the internal memory. The transmission unit 818 transmits, to the user terminal 120, the still-image region information on the still-image region of the screen image of the second frame and the inter-screen prediction encoded stream.

In step S1502, the hardware still-image decoder 215 generates a decoded image of the still-image region by decoding the inter-screen prediction encoded stream for the image of the still-image region of the screen image of the second frame, and stores the generated decoded image in the local decoded image buffer 610.

<Flow of Screen Transfer Processing in User Terminal>

Figure 16A:
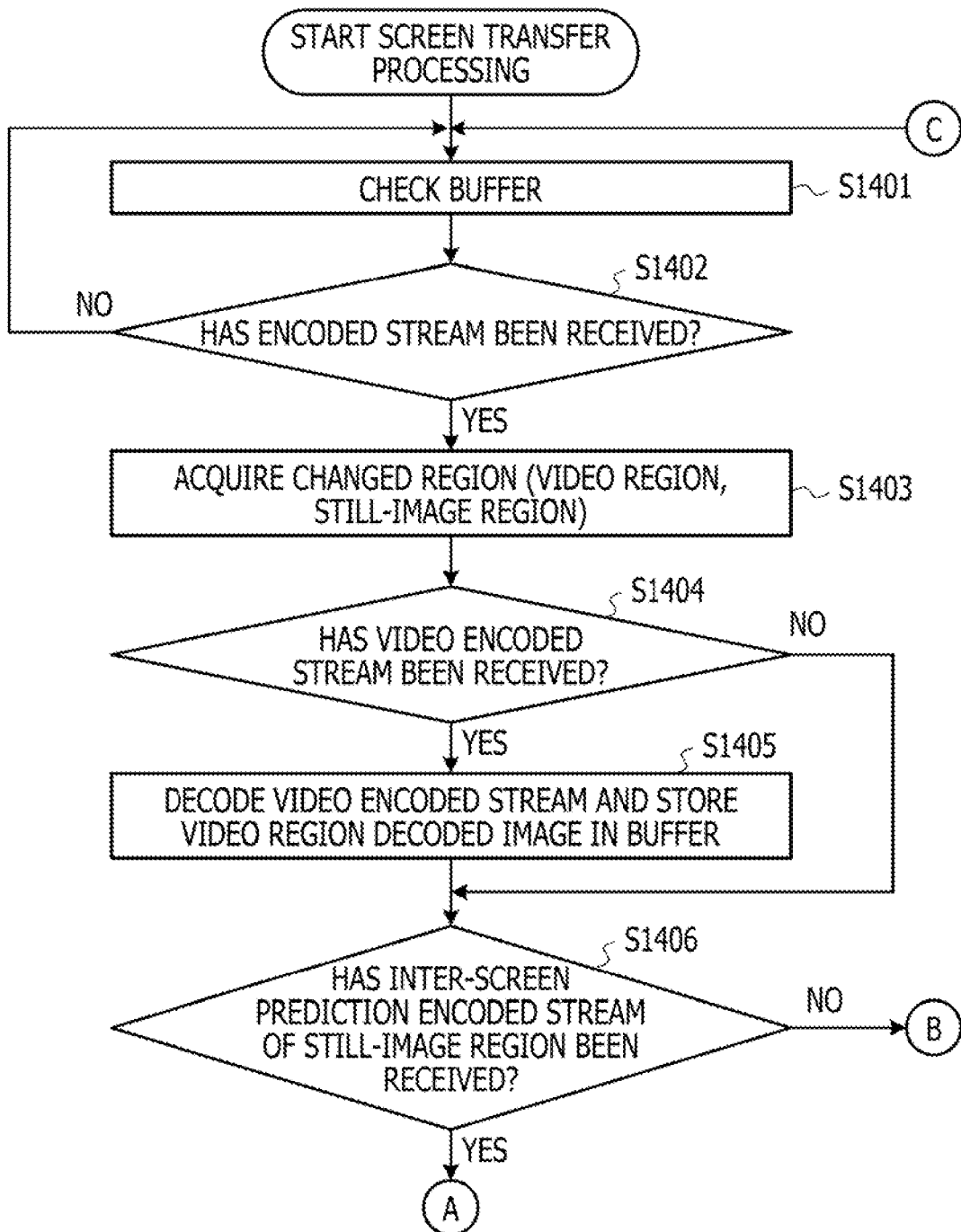

Next, a flow of screen transfer processing in the user terminal 120 will be described. FIGS. 16A and 16B are a second flowchart illustrating the flow of screen transfer processing in the user terminal. The difference from FIGS. 14A and 14B are that it includes step S1601 and step S1602.

In step S1601, the hardware still-image decoder 314 receives an inter-screen prediction encoded stream for the screen image of the second frame. The hardware still-image decoder 314 decodes the inter-screen prediction encoded stream for the image of the still-image region of the screen image of the second frame by referring to the decoded image of the still-image region held in the internal memory of the hardware still-image decoder 314. The hardware still-image decoder 314 holds, in the internal memory, a decoded image of the still-image region generated by decoding the inter-screen prediction encoded stream for the image of the still-image region of the screen image of the second frame.

In step S1602, the hardware still-image decoder 314 stores the generated decoded image of the still-image region in the decoded image buffer. Thus, a screen image of the second frame is generated. The generated screen image is displayed on the UI device 340.

As is apparent from the above description, the virtual desktop server 110 according to the second embodiment performs intra-screen prediction encoding and transmission of still-image region information and encoding condition in the processing of the first frame after being switched from the video region to the still-image region, and performs inter-screen prediction encoding and transmission of an inter-screen prediction encoded stream in the processing of the second frame after being switched from the video region to the still-image region.

Thus, according to the second embodiment, as in the first embodiment, the amount of generated code may be suppressed when encoding an image of the still-image region of the screen image.

Third Embodiment

In the first embodiment, the case in which the function of each unit illustrated in FIG. 8 is implemented by the virtual desktop server 110 has been described. However, a device that implements the function of each unit illustrated in FIG. 8 is not limited to the virtual desktop server 110, and any information processing device that performs encoding processing in the screen transfer system may implement the functions.

In the first embodiment, the hardware video encoder, the hardware video decoder, the hardware still-image encoder, and the hardware still-image decoder are described as being installed in the processor. However, the hardware video encoder, the hardware video decoder, the hardware still-image encoder, and the hardware still-image decoder may be disposed outside the processor.

In the first embodiment, all of the video encoder, the video decoder, the still-image encoder, and the still-image decoder are described as being implemented by hardware, but for example, the video encoder and the video decoder may be implemented by software.

The present disclosure is not limited to the configurations illustrated herein while the configurations exemplified according to the aforementioned embodiments may also be combined with other elements, for example. These aspects may be changed without departing from the gist of the present disclosure and appropriately set in accordance with applied modes thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encoding apparatus, comprising:
   a memory; and
   a processor coupled to the memory and configured to:
   perform intra-screen prediction encoding on an image of a region of a still image cut out from a first decoded image corresponding to a screen image before a predetermined region is switched from a video to a still image,
   generate a second decoded image obtained by decoding information for which the intra-screen prediction is performed, and
   when a first screen image after the predetermined region is switched from a video to a still image is received, perform inter-screen prediction encoding on an image of a region of a still image cut out from the first screen image after switching to a still image, by referring to the generated second decoded image.

2. The encoding apparatus according to claim 1, wherein the processor is configured to:
   store, in an internal memory, the second decoded image stored in a storage device, and
   when a first screen image after the predetermined region is switched from a video to a still image is input, perform inter-screen prediction encoding by referring to the internal memory.

3. The encoding apparatus according to claim 2, wherein the processor is configured to:
   determine a position of a still-image region of the first screen image after switching, generate still-image region information based on the position of a still-image region of the first screen image, and cut out the image of a region of a still image from a decoded image of the screen image before switching.

4. The encoding apparatus according to claim 3, wherein the processor is configured to:
store, in the internal memory, an image of a still-image region cut out from the first screen image after switching, and
when a second screen image after the predetermined region is switched from a video to a still image is input, perform inter-screen prediction encoding on an image of a still-image region cut out from the second screen image after switching by referring to the internal memory.

5. The encoding apparatus according to claim 1, wherein the processor is configured to:
generate, by a video encoder, an encoded video stream by performing video encoding on a screen image before the predetermined region is switched from a video to a still image, and
generate, by a video decoder, a decoded image of the screen image by decoding an encoded video stream for the screen image before switching.

6. The encoding apparatus according to claim 4, wherein
wherein the first screen image is a screen image of a first frame after the predetermined region is switched from a video to a still image, and
wherein the second screen image is a screen image of a second frame after the predetermined region is switched from a video to a still image.

7. A decoding apparatus, comprising:
a memory; and
a processor coupled to the memory and configured to:
perform intra-screen prediction encoding on an image of a still-image region cut out from a decoded image of a screen image generated by using an encoded video stream for a screen image before a predetermined region is switched from a video to a still image,
generate a decoded image of a still-image region of the screen image before switching by decoding a stream generated by the intra-screen prediction encoding, and
when a stream generated by inter-screen prediction encoding on a still-image region of a first screen image after the predetermined region is switched from a video to a still image is input, decode the stream generated by inter-screen prediction encoding by referring to the decoded image of a still-image region of the screen image before switching.

8. The decoding apparatus according to claim 7, wherein the processor is configured to:
store, in an internal memory, the decoded image of a still-image region of the screen image before switching, and
when an inter-screen prediction encoded stream for the still-image region of a first screen image is input, decode the inter-screen prediction encoded stream by referring to the internal memory.

9. A encoding method executed by a computer, the encoding method comprising:
performing intra-screen prediction encoding on an image of a region of a still image cut out from a first decoded image corresponding to a screen image before a predetermined region is switched from a video to a still image;
generating a second decoded image obtained by decoding information for which the intra-screen prediction is performed; and
when a first screen image after the predetermined region is switched from a video to a still image is received, performing inter-screen prediction encoding on an image of a region of a still image cut out from the first screen image after switching to a still image, by referring to the generated second decoded image.

10. A decoding method executed by a computer, the encoding method comprising:
performing intra-screen prediction encoding on an image of a still-image region cut out from a decoded image of a screen image generated by using an encoded video stream for a screen image before a predetermined region is switched from a video to a still image;
generating a decoded image of a still-image region of the screen image before switching by decoding a stream generated by the intra-screen prediction encoding; and
when a stream generated by inter-screen prediction encoding on a still-image region of a first screen image after the predetermined region is switched from a video to a still image is input, decoding the stream generated by inter-screen prediction encoding by referring to the decoded image of a still-image region of the screen image before switching.

11. A non-transitory computer-readable storage medium storing a program that causes a computer to execute a process, the process comprising:
performing intra-screen prediction encoding on an image of a region of a still image cut out from a first decoded image corresponding to a screen image before a predetermined region is switched from a video to a still image;
generating a second decoded image obtained by decoding information for which the intra-screen prediction is performed; and
when a first screen image after the predetermined region is switched from a video to a still image is received, performing inter-screen prediction encoding on an image of a region of a still image cut out from the first screen image after switching to a still image, by referring to the generated second decoded image.

12. A non-transitory computer-readable storage medium storing a program that causes a computer to execute a process, the process comprising:
performing intra-screen prediction encoding on an image of a still-image region cut out from a decoded image of a screen image generated by using an encoded video stream for a screen image before a predetermined region is switched from a video to a still image;
generating a decoded image of a still-image region of the screen image before switching by decoding a stream generated by the intra-screen prediction encoding; and
when a stream generated by inter-screen prediction encoding on a still-image region of a first screen image after the predetermined region is switched from a video to a still image is input, decoding the stream generated by inter-screen prediction encoding by referring to the decoded image of a still-image region of the screen image before switching.

* * * * *